United States Patent [19]

Hosokawa et al.

[11] Patent Number: 5,444,677
[45] Date of Patent: Aug. 22, 1995

[54] OPTICAL READ/WRITE HEAD LOW ANGLE BEAMSPLITTER AND COPLANAR DETECTORS

[75] Inventors: Hayami Hosokawa, Yawata; Tatsuo Ohgaki; Kouhei Tomita, both of Nagaokakyo; Hironobu Kiyomoto, Nara; Naru Yasuda, Uji; Shinya Otsuki, Nagaokakyo, all of Japan

[73] Assignee: Omron Corporation, Kyoto, Japan

[21] Appl. No.: 25,687

[22] Filed: Mar. 3, 1993

[30] Foreign Application Priority Data

| Mar. 3, 1992 | [JP] | Japan | 4-081598 |
| Aug. 24, 1992 | [JP] | Japan | 4-247408 |
| Sep. 30, 1992 | [JP] | Japan | 4-285476 |
| Nov. 5, 1992 | [JP] | Japan | 4-295581 |

[51] Int. Cl.$^6$ .............. G11B 11/00; G11B 7/00
[52] U.S. Cl. .................... 369/13; 369/44.23; 369/44.38; 369/112
[58] Field of Search ............ 369/13, 14, 15, 110, 369/112, 116, 44.11, 44.14, 44.34, 44.38, 121, 120, 44.23, 44.24, 44.37; 360/114, 59; 365/122

[56] References Cited

U.S. PATENT DOCUMENTS

| 5,161,139 | 11/1992 | Inoue et al. | 369/44.23 |
| 5,231,620 | 7/1993 | Ohuchida | 369/44.14 |

FOREIGN PATENT DOCUMENTS

| 0319033 | 6/1989 | European Pat. Off. . |
| 0339722 | 11/1989 | European Pat. Off. . |
| 3802538 | 8/1988 | Germany . |
| 59-203259 | 4/1985 | Japan . |

OTHER PUBLICATIONS

Patent Abstracts of Japan vol. 14, No. 50 (P-998)(3993) 30 Jan. 1990 & JP-A-12 79 445 (Sharp Corp.) 9 Nov. 1989 *abstract*.
Patent Abstracts of Japan vol. 14, No. 274 (P-1061)(4217) 13 Jun. 1990 & JP-A-27 9 241 (Hitachi Ltd) *abstract*.
Patent Abstracts of Japan vol. 6, No. 116 (P-125)(994) 29 Jun. 1982 & JP-A-57 44 241 (Matsushita Denki Sangyo K.K.) 12 Mar. 1982 *abstract*.
Patent Abstracts of Japan vol. 13, No. 54 (P-824) 8 Feb. 1989 & JP-A-63 244 346 (Matsushita Electric Ind Co Ltd) 11 Oct. 1988 *abstract*.

Primary Examiner—Ali Neyzari
Attorney, Agent, or Firm—Pennie & Edmonds

[57] ABSTRACT

An optical read/write head for a magnetic-optic recording and reproducing unit having a beam splitter placed between a collimator lens and an objective lens. The optical path of the beam reflected by a recording disk is bent by the beam splitter and the beam strikes a polarizing beam splitter. The polarizing beam splitter splits the reflected beam into P and S polarized components whose optical axes form n angel of less than 90°. The rays of the P and S polarized components strike respective light detecting elements and which are co-arranged on substantially the same surface.

27 Claims, 22 Drawing Sheets

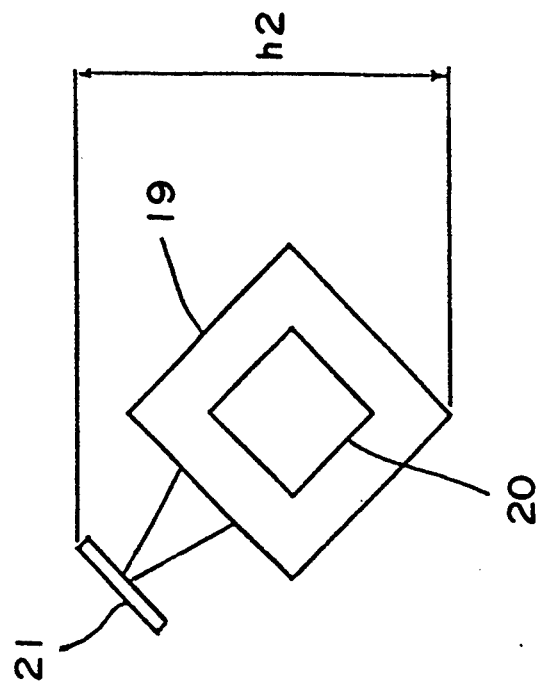
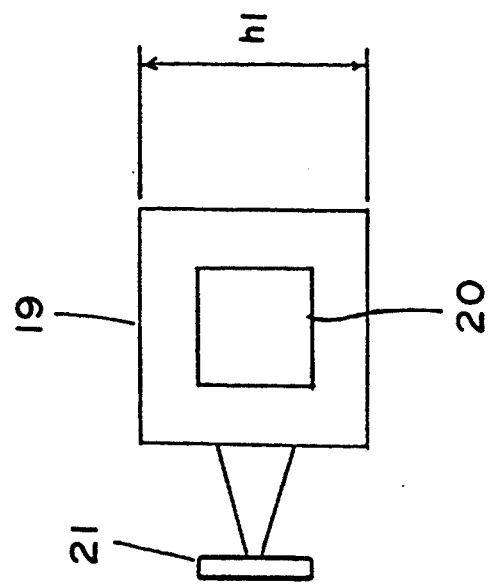
FIG. 2(a) PRIOR ART
FIG. 2(b) PRIOR ART

DIRECTION OF TRACKING LINES

DIRECTION OF TRACKING GROOVES

DIRECTION OF TRACKING GROOVES

OPTICAL READ/WRITE HEAD LOW ANGLE BEAMSPLITTER AND COPLANAR DETECTORS

FIELD OF THE INVENTION

This invention relates to an optical read/write head and an optical device for reading and writing data on magnetic-optic recording media such as optical or magnetic-optic disks (hereafter, simply "disks").

BACKGROUND

Conventional types of magneto-optical recording and reproducing units (hereafter, "MO drivers") typically use a disk made from a magnetic material such as GdFeCo or TbFeCo. The disk is magnetized with the poles perpendicular to the disk's surface to record or store data, which can be retrieved. Specifically, this type of MO driver projects a laser beam onto a location on the disk so as to apply enough energy to bring the temperature above the Curie point. Data are recorded by applying magnetization which corresponds to the polarity of magnetization of an external magnetic field in the direction perpendicular to the disk's surface. To read out the data recorded on the disk, the Kerr effect is utilized. This refers to the fact that the plane of polarization of the reflected laser beam will be rotated slightly in accord with the direction of magnetization of the disk. The varying strengths of the polarized P component and the polarized S component of the light reflected off the disk are detected.

FIG. 1 is a block diagram illustrating an example of a relevant prior art MO driver. The example shown is the type of MO driver which modulates the magnetic field. In FIG. 1, the disk 1 is rotated by a spindle motor 2. An optical system 100 projects a laser beam onto the recording side of the disk 1 (the bottom side of the diagram). A magnetic circuit system 300 generates an external magnetic field on the non-recording side of the disk (the top side in the diagram). The optical system 100 is moved along the radius of disk one by a carriage (not pictured). The optical system 100 comprises a semiconductor laser diode (hereafter "LD") 11, which emits a laser beam; a collimator lens 12, which renders the divergent light emitted by the LD 11 into a virtually parallel luminous flux; and a grating element (hereafter grating) 13, which causes the luminous flux to diverge along numerous rays by diffraction. The light which passes through the grating 13 transmits to an objective lens 15 by way of a beam splitter 14 and focused onto the disk 1.

The grating 13 is needed when the well-known three-beam method is used as the tracking servo mechanism. If a single-beam tracking servo mechanism, such as a push-pull device, is adopted, the grating 13 can be eliminated.

The light reflected off the disk 1 is transmitted to the beam splitter 14 by way of the objective lens 15. The portion of the light which is reflected off the original optical path strikes a λ/2 plate 16, and its plane of polarization is rotated 45°. This reflected light is refracted using a condensing lens 17 and a cylindrical lens 18, in which the light undergoes a point-spread aberration when it passes through the cylindrical lens 18. The light is then transmitted to a polarizing beam splitter (hereafter "PBS") 19. The PBS 19 transmits, what is labelled for reference as, the polarized P component of the reflected light and reflects the polarized S component. The PBS 19 thus splits the light or beam into its components, which are separately focused onto light detecting elements 20 and 21, respectively.

FIG. 2(a) shows the relative position of the light detecting elements 20 and 21 and the PBS 19 as viewed from direction A in FIG. 1. To read data recorded on the disk 1, the signal differences between the output of the light detecting element 20 and the output of the light detecting element 21 are computed. One of the elements (in this example, element 20) is segmented in an appropriate manner, and the spatial distribution, intensity, and other characteristics of the received beam are used to generate the necessary error signals for focus control and tracking control servos.

The portion of the optical system 100 from the collimator lens 12 through the beam splitter 14 to the objective lens 15 is called the condensing optical system. The portion travelled by the beam from the time it is reflected off the beam splitter 14 until it reaches light detecting elements 20 and 21 is called the photodetector optical system.

The magnetic circuit system 300 consists of a coil 31, which supplies the external magnetic field, and a driver 32, which supplies the current that flows through the coil 31. The driver 32 controls the polarity of the current it supplies to the coil 31 based on the modulating signal generated by an encoder 33.

There are problems, however, with the above-described prior art MO driver. For example, as was discussed above, the optical read/write heads in the prior art MO drivers use the PBS 19 to split the reflected light into virtually orthogonal paths. The light detecting elements 20 and 21 have to be positioned in the paths of the split beam. This not only makes it problematical to set up and adjust the light detecting elements, it also makes it impractical to downsize the optical read/write head.

One possible solution may be to eliminate the λ/2 plate 16 for purposes of downsizing the read head. However, if this were done, the plane of polarization would tilt with respect to the PBS 19, which would have to be tilted in response thereto. If the PBS 19 were tilted, for instance, at an angle of 45°, it would require a vertical spacing with a height of h2 as shown in FIG. 2(b). This height h2 requires a greater space occupation and thus is not desirable in comparison to the former height h1 (the vertical spacing required when λ/2 plate 16 is used) shown in FIG. 2(a).

A second possible solution is to downsize the read head by placing the photodetector optical system between the LD 11 and the collimator lens 12. Specifically, the beam splitter 14 would be placed between the LD 11 and the collimator lens 12, as shown in FIG. 3. The beam splitter 14 would split the light reflected off the disk 1, and the split reflected light would be transmitted to the PBS 19.

However, if the configuration such as that shown in FIG. 3 is chosen, the light detecting elements 20 and 21 would interfere with each other, and the light detecting element 21 would also interfere with the beam splitter 14 (crosshatched areas in FIG. 3). The reason for this is the spacing requirement of the various components and panels required to enable positioning and mounting of the photodetector optical system. This difficulty would severely limit design freedom. There is also a possibility that the mounting panel on the light detecting element 21 would obstruct the light emitted by the LD 11.

To prevent the optical elements from interfering with each other, one might consider using a concave lens 22, as shown in FIG. 4. However, this too would result in a larger optical read/write head; and the increase in required components and adjustment processes would inflate the cost thereof.

Still another solution might be to use the two light detecting elements 20 and 21 arranged in a same plane. That is, a Wollaston prism 23 shown in FIG. 5 would be substituted for the PBS 19 of the embodiment shown in FIG. 1. Then the polarized P component and the polarized S component would be split along nearly the same direction. If the paths of the polarized P and S components exiting the prism 23 were lengthened, then light detecting elements 20 and 21 could be arranged side by side in the same plane. However, the Wollaston prism 23, which is required in this embodiment, is quite expensive. Furthermore, the angle $\theta$ formed by the flux of the polarized P component and that of the polarized S component separated by the Wollaston prism 23 would only be 1°±0.03°. Because the angle is so small, it is not possible to place the light detecting elements 20 and 21 next to each other unless the elements are sufficiently distant from the prism 23. Ultimately, this scheme would not allow the optical read/write head to be made smaller.

As can be seen in FIG. 3, the length of the optical path is limited by the focusing distance of the collimator lens 12. This would also make use of the Wollaston prism 23 extremely difficult.

SUMMARY OF THE INVENTION

Accordingly, the main objective of the present invention is to solve the problems inherent in prior art optical read/write heads and provide an optical read/write head for a magnetic-optical recording and reproducing unit which can be made smaller and easy to assemble and adjust.

Another object of the present invention is to streamline the components and obviate the need for optical elements such as a $\lambda/2$ plate or a Wollaston prism.

The present objective is achieved in the present invention by using an optical system which works with polarized light.

Specifically, in one embodiment of the present optical system, a collimator lens is used to form a virtually parallel laser beam. A beam splitter is positioned on the optical path between the collimator lens and an objective lens, which focuses the parallel laser beam onto an optical recording medium such as a magneto-optical disk, where the beam is parallel. The objective lens also renders the light reflected off the disk into a virtually parallel beam. The beam splitter reflects the laser light passing through the collimator lens to transmit therethrough and permits the beam which reflects off the disk and passes through the objective lens into a condensing lens which focus the beam and further transmits to a PBS. The PBS splits the reflected beam into two mutually orthogonally polarized components. The PBS is placed so that the angle formed by the optical axes of the two polarized components is less than 90°. Two light detecting elements receive the split beams according to the direction of polarization. A substrate positions the two light detecting elements, which ensures orientation of the light detecting elements in virtually the same direction.

In another embodiment of the present invention, the beam splitter is placed on the optical path between a laser element and the collimator lens, where the laser beam is divergent. In this embodiment, the beam which is reflected off the disk is reflected off the beam splitter and is directly transmitted to the PBS, without using the condensing lens. The PBS in this embodiment is also placed so that the angle formed by the optical axes of the two polarized components is less than 90°. Two light detecting elements are used as in the first embodiment.

In yet another embodiment, a transparent panel of a plane parallel plate is placed in the optical path between the semiconductor laser and the BS, to correct any aberration induced by the BS. The transparent panel can be also used to reflect the light emitted by the luminous element to a light detecting element.

In yet another embodiment, a mirror and the BS are placed in the optical path between the illuminating element and the objective lens along where the beam diverges. The mirror bends the beam by 90°.

In yet another embodiment, the BS is placed in the optical path between the collimator lens and the light detecting elements to generate point-spread aberrations. The BS directly sends the light reflected off the disk 1 to the PBS. The optical axis of the PBS is preferably rotated 45° from the center so that the beams from the PBS fall precisely on the light detecting elements.

The present invention contemplates providing the light detecting elements in the same direction or in a different direction. Further, the light detecting elements may be placed on a single substrate in a same plane or in a different plane. For example, an inclined surface may be provided on the base which supports the light detecting elements so that the receptive surfaces of light detecting elements will form an angle greater than 90°. Moreover, two different levels which are parallel to each other may be provided on the base so that the positions of the light detecting elements coincide with the focal points of the beam split by the PBS. Further, the light can be focused by a convex lens provided on the receptive surface of the base, on which the light detecting elements are mounted. Moreover, the beams may be focused at different angles of incidence on the receptive surface of the base on which the light detecting elements are mounted. These bases for the light detecting elements keep the distance between the light detecting element short, which allows the read/write head to be made smaller.

The present invention will become more readily apparent in the ensuing specification viewed together with the drawings.

BRIEF DESCRIPTION OF THE DRAWINGS

FIG. 2 is a view of the optical read/write head of FIG. 1 as seen from direction A of FIG. 1.

DETAILED DESCRIPTION OF THE DRAWINGS

Figure 1:
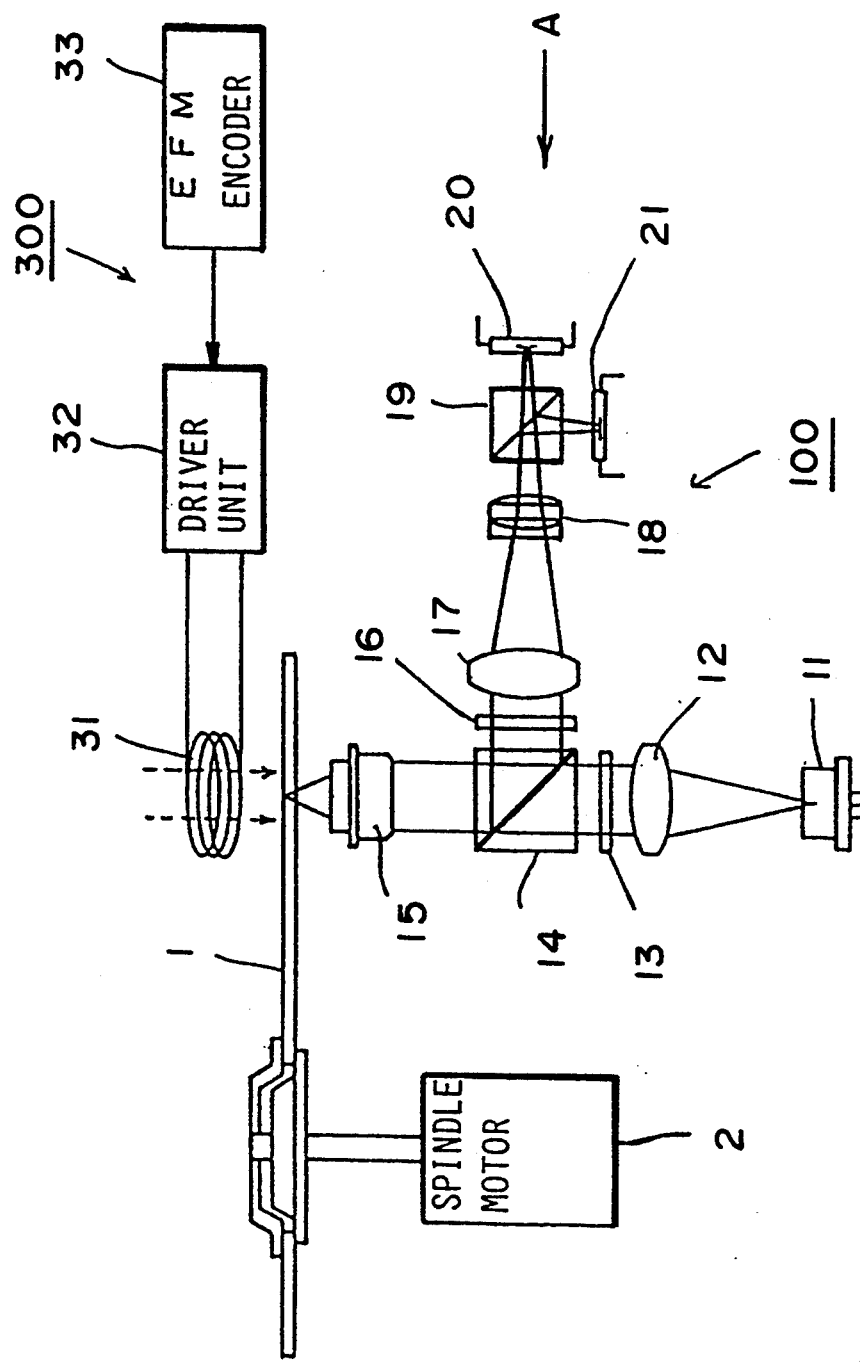
FIG. 1 is a block diagram illustrating the structure of a prior art optical read/write head.
Figure 3:
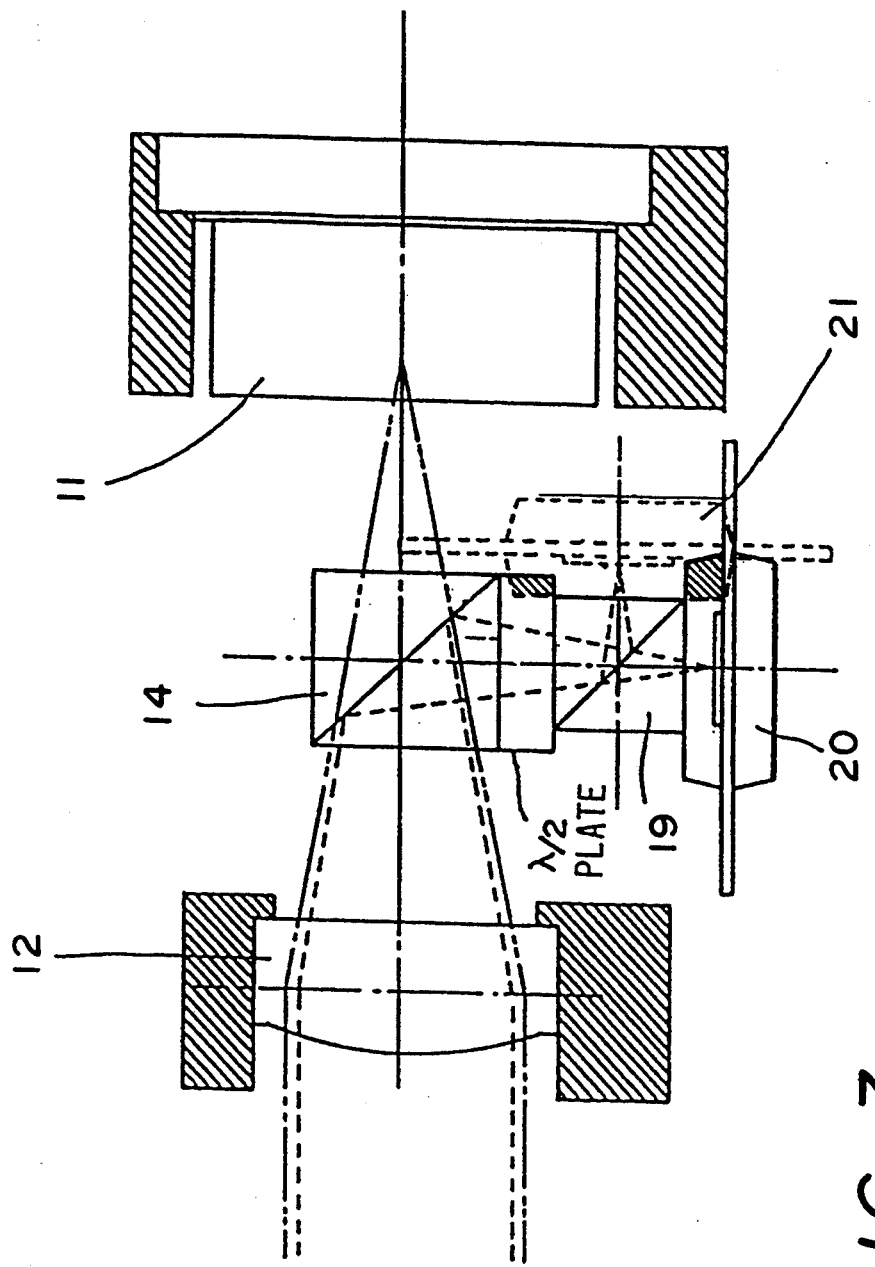
FIG. 3 is a block diagram illustrating the essential parts of another example of a prior art optical read/write head.
Figure 4:
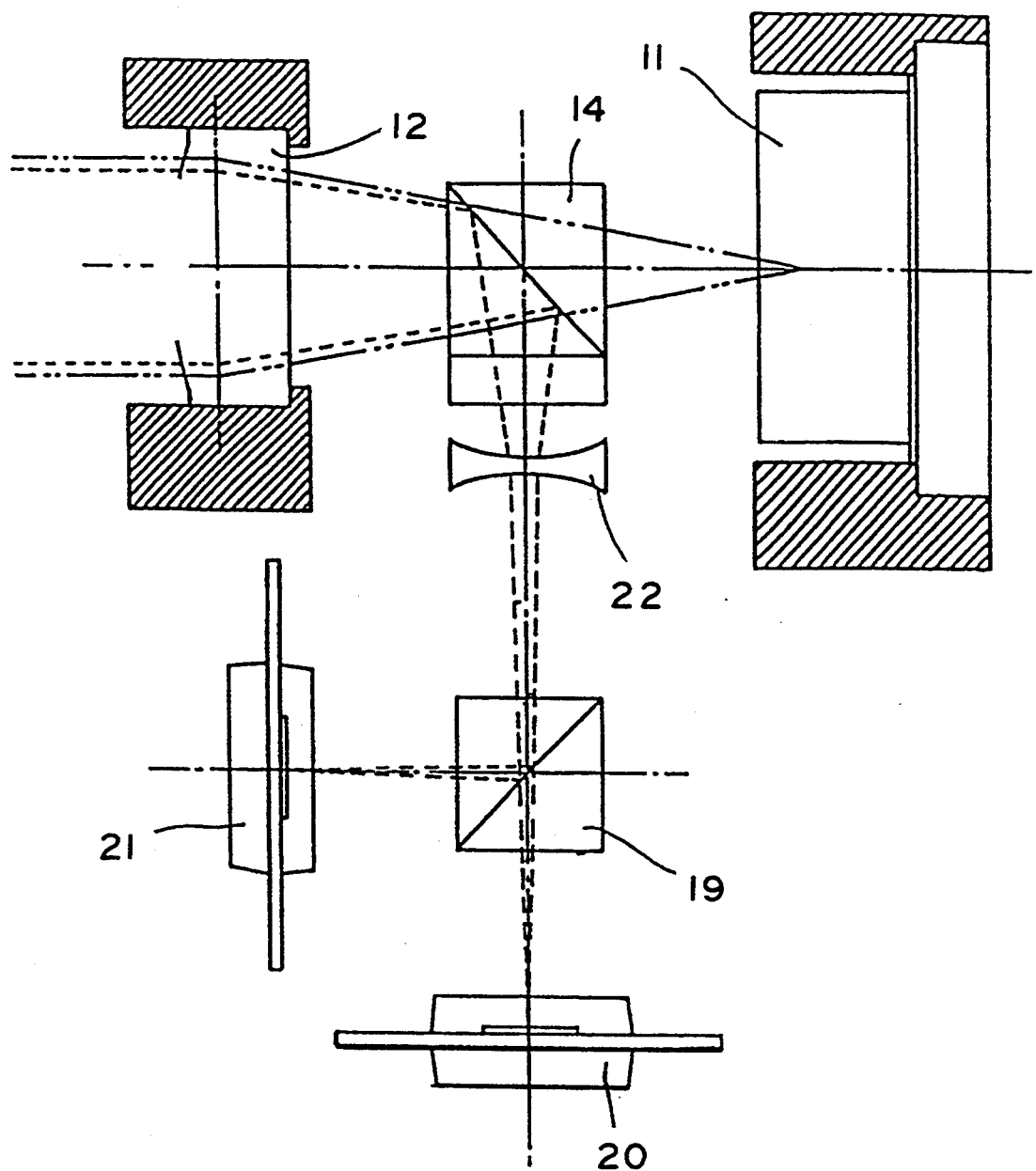
FIG. 4 is a block diagram illustrating the essential parts of still another example of a prior art optical read/write head.
Figure 5:
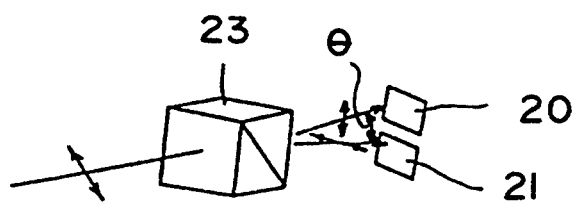
FIG. 5 is a perspective view of a Wollaston prism.

Many different embodiments of the present invention are contemplated in the drawings. For convenience, the same or equivalent elements of the present invention illustrated in the drawings have been identified with same reference numerals. The elements corresponding to those of prior art optical read/write heads use the same reference numbers, and explanation is omitted where appropriate.

The embodiments described herein have been contemplated for purposes of illustrating the principles of the present invention. Accordingly, the present invention is not to be limited solely to the exact configuration and construction as illustrated and set forth herein.

Figure 6:
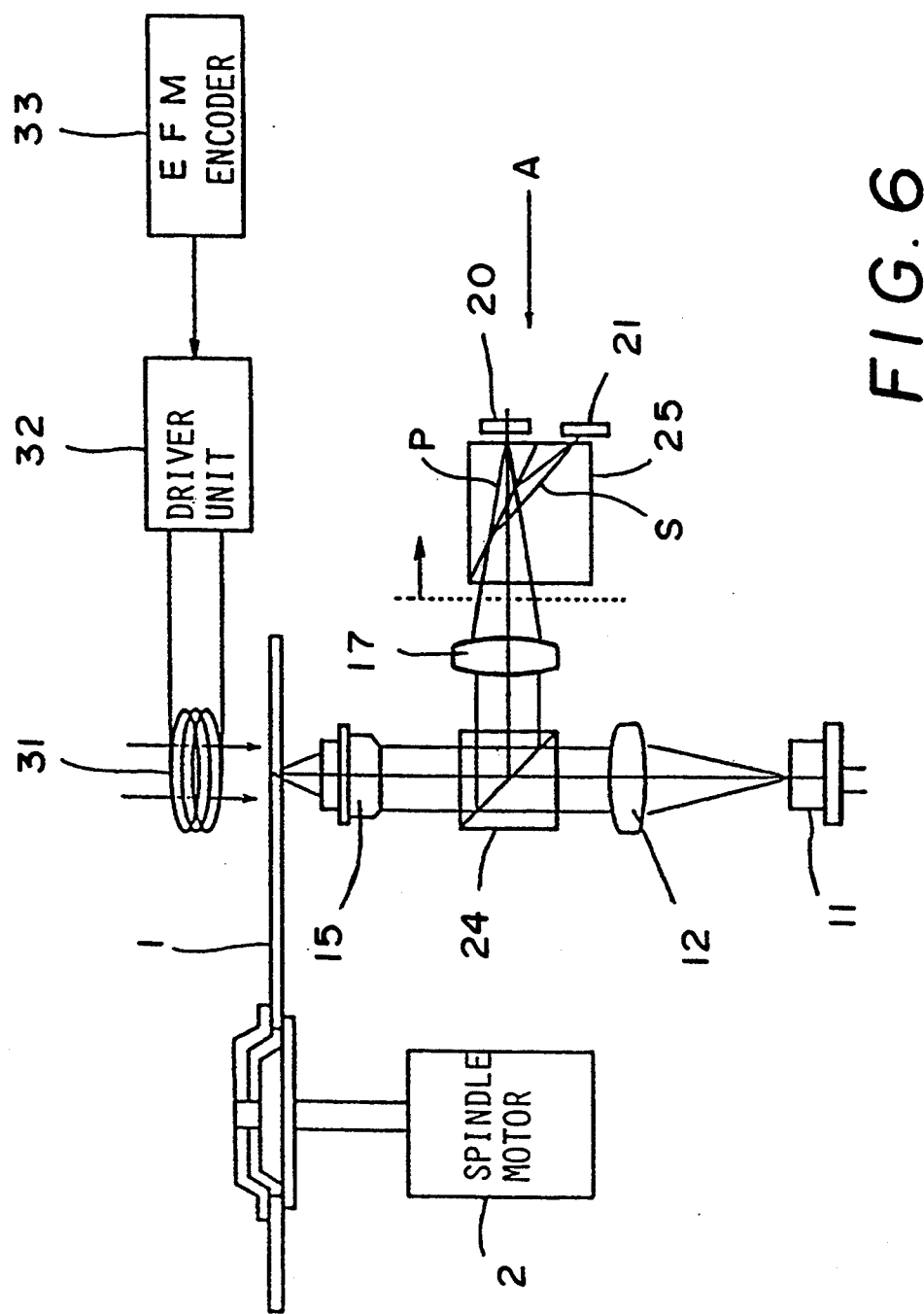
FIG. 6 is a block diagram illustrating the structure of a first embodiment of an optical read/write head.

FIG. 6 is a block diagram showing the structure of one embodiment of an optical read/write head according to the present invention. A beam condensing optical system in this embodiment comprises a collimator lens 12, also referred hereafter as a first lens, and an objective lens 15, also referred hereafter as a second lens. A beam splitter (hereafter "BS") 24, which is also referred hereafter as a first optical element, is placed between the collimator lens 12 and the objective lens 15. A semiconductor laser 11 serves as the luminous source. In this embodiment, the polarized P component of the laser beam strikes the beam splitting surface of the BS 24, which splits the beam in such a way that the reflectivity ("$RS_1$") toward the polarized S component of the beam reflected off the disk 1 is greater than the reflectivity ("$RP_1$") toward the polarized P component. In this case, $RP_1$ will be between 10 and 30% and $RS_1$ will be approximately 100%. The beam which reflects off the disk 1 and which is also reflects off the BS 24 transmits through a condensing lens 17 and strikes a PBS 25 which is also referred hereafter as a second optical element.

The PBS 25 transmits the polarized P component of the light reflected off disk 1 through its own reflecting surface to a light detecting element 20 (photodetector). There, polarized S component reflects off the PBS 25 and transmitts to a light detecting element 21 (photodetector). The reflectivity ("$RP_2$") in the PBS with respect to the polarized P component is less than or equal to 10%. The reflectivity ("$RS_2$") in the PBS 25 with respect to the polarized S component is greater than or equal to 90%. The reflective surface of the PBS 25 separates the optical axes of the polarized P component which is transmitted and the polarized S component which is reflected. The angle of separation between the axes is greater than 45° and less than 90°. This allows light detecting elements 20 and 21 to be arranged in virtually the same plane, as shown in FIG. 6.

To detect the rotation of the plane of polarization caused by the disk 1, the PBS 25 is tilted so that each direction of polarization of the split beams forms an angle of approximately 45° with respect to the polarized P component as viewed from the beam splitting surface of the BS 24.

Figure 7:
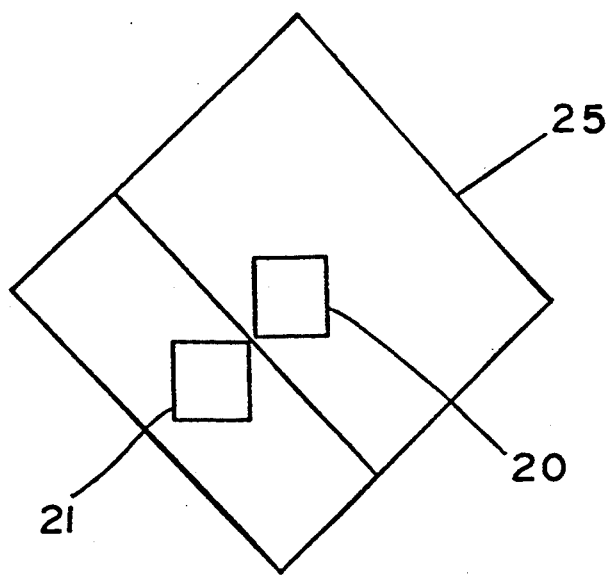
FIG. 7 is a view of the optical read/write head of FIG. 6 as seen from direction A of FIG. 6.

FIG. 7 is a view of the PBS 25 and light detecting elements 20 and 21 as seen from direction A of FIG. 6. The distance in the direction of height as seen from direction A is projected so as to appear as a diagonal line on the PBS 25.

Figure 8:
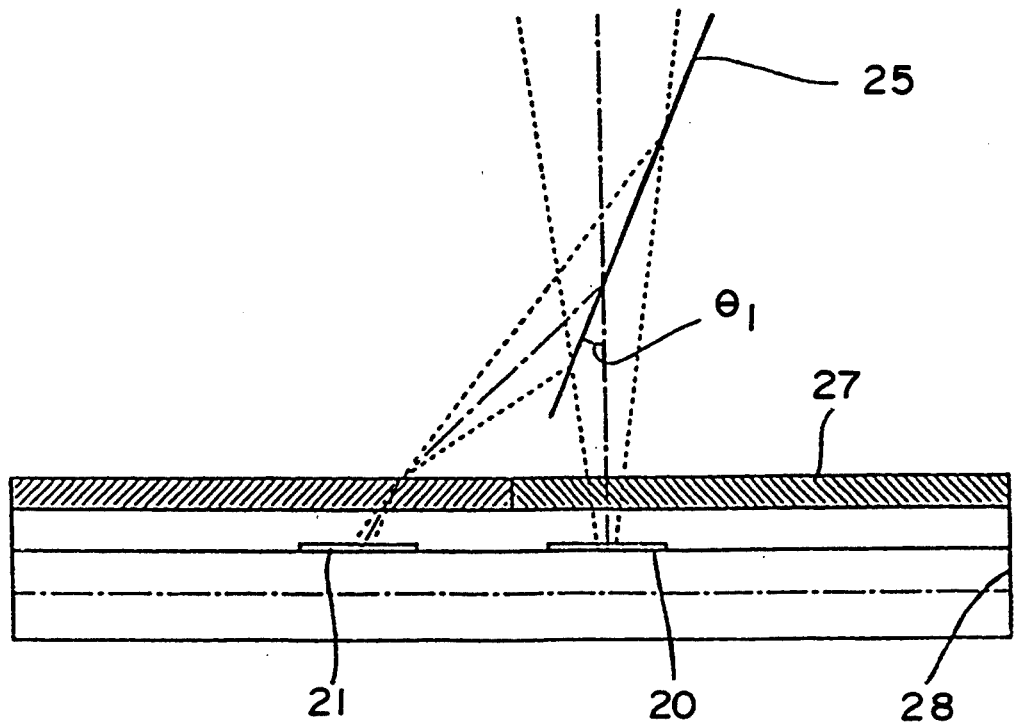
FIG. 8 is a magnified lateral view of the PBS and light detecting elements.

FIG. 8 shows an enlarged view of the relationship between the PBS 25, the light detecting elements 20 and 21, and the light striking these optical elements. The PBS 25 transmits the polarized P component through its own reflecting surface. The P component strikes the light detecting element 20 before it reaches its focal point. The S component, which is reflected off the PBS 25, strikes the light detecting element 21 after it reaches its focal point.

The light detecting elements 20 and 21 are contained in a substrate 28, which has two analyzers 27 on its photoreceptive surface. Each analyzer increases the optical quenching ratio of the cross-polarized component with respect to the desired component.

Figure 9:
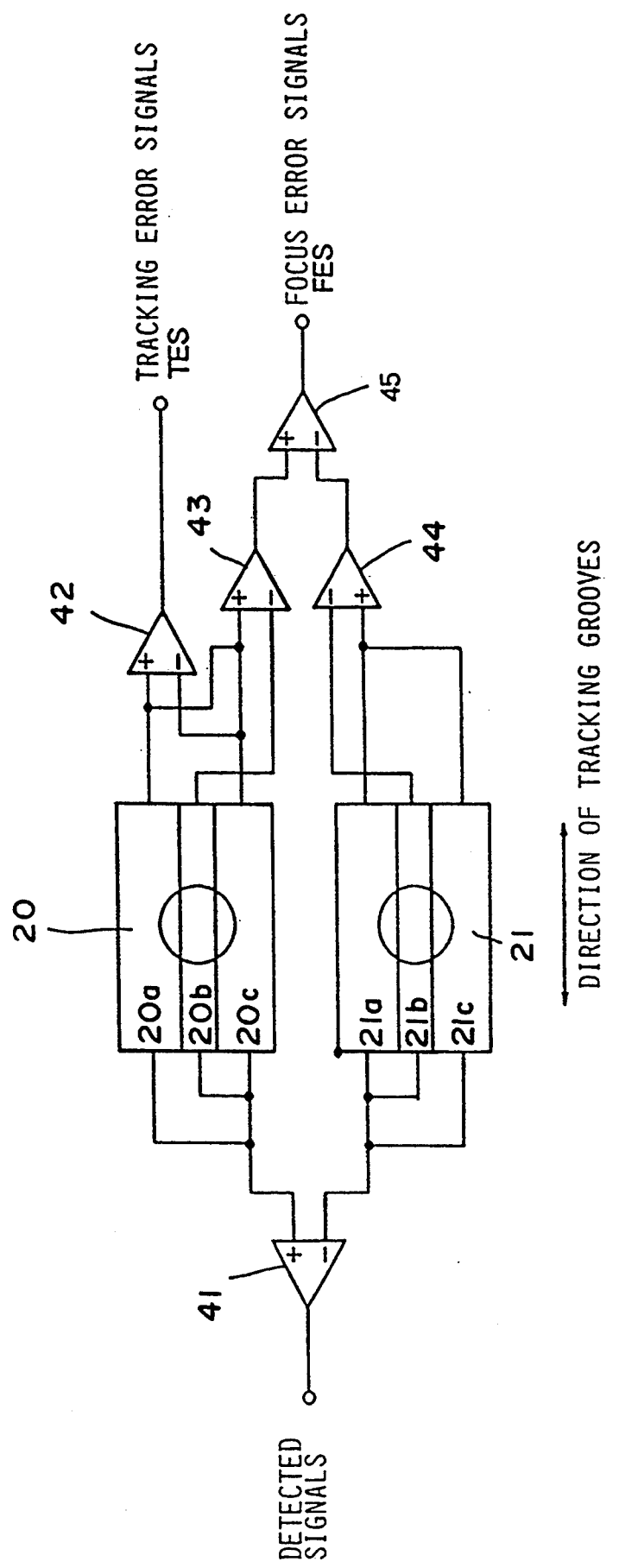
FIG. 9 is a block diagram illustrating the structure of light detecting elements and their peripheral circuits in the first example of an optical read/write head.

FIG. 9 is a block diagram showing details of the light detecting elements 20 and 21 as well as the circuit which generates, from the light which strikes the photodetector elements 20 and 21, detecting signals, focus error signals and tracking error signals. As the block diagram shows, each of the elements 20 and 21 is divided into three photodetection regions, 20a,20b,20c and 21a,21b,21c. The lines which divide the regions are oriented so that they are parallel with the tracking grooves provided on disk 1. Each of the regions 20a,20b,20c and 21a,21b,21c converts the light received in that region to an electrical signal corresponding to the quantity of light, which is then output.

The output signals from the photodetection regions 20a,20b,20c of the light detecting element 20 are supplied to the non-inverting input terminal of a differential amplifier 41. The output signals from photodetection regions 21a,21b,21c of the light detecting element 21 are supplied to the inverting input terminal of the differential amplifier 41. The difference between the total output of the light detecting element 20 and that of the light detecting element 21 is calculated by the differential amplifier 41, the difference becoming the reproducing signal. The difference between the output from the photodetection region 20a and that from the region 20c is calculated by a differential amplifier 42, and a tracking error signal ("TES") is obtained therefrom through the use of a conventional push-pull method. Similarly, the tracking error may be detected using the conventional push-pull method from the comparison of the photodetection regions 21a and 21c.

The sum of the signals from regions 20a and 20c of the light detecting element 20 is supplied to the non-inverting input terminal of a differential amplifier 43, and the output signal from region 20b is supplied to the inverting input terminal on that amplifier. The difference between these signals is calculated by the differential amplifier 43. The sum of the signals from the regions 21a and 21c of the light detecting element 21 and the signal difference from the region 21b is input to a differential amplifier 44.

The output of differential amplifier 43 is supplied to the non-inverting input terminal of a differential amplifier 45, and that of differential amplifier 44 to the inverting input terminal of the amplifier 45. The differential amplifier 45 calculates the difference between these two values and generates a focus error signal ("FES") by using a conventional beam size method.

As previously discussed with respect to FIG. 8, the light detecting element 20 is positioned in front of the focal point of the incident beam, and the light detecting element 21 behind it. When the state of the focus varies, the diameters of the beams striking elements 20 and 21 vary accordingly. By monitoring this variation, the output of differential amplifier 45 can be used for focusing. Only when there is a proper focus, the output of amplifier 45 will be 0. Otherwise, a non-zero focus error signal occurs, which is output to a polarity which corresponds to the direction of the error.

When the angle of incidence at which the polarized S component strikes the light detecting element 21 is large, the shape of the beam will be distorted at the surface of element 21 due to the effect of coma aberration. In this case, it might not be possible to detect a focus error signal using the conventional beam size method. Thus, it is desirable to keep the angle formed by the optical axis of the polarized S component and a line normal to the light detecting element 21 under 50°.

In operation of the embodiment of FIG. 6, the polarized P component of the light emitted by the semiconductor laser 1 passes through the collimator lens 12 and strikes the BS 24. Because the BS 24 is highly transmissive with respect to the polarized P component, the greater part of the light passes through the objective lens 15 and strikes the disk 1. The plane of polarization of the light striking the disk 1 is rotated according to the direction in which the disk is magnetized. This light, which includes the polarized S component, is reflected off the disk, passes through the objective lens 15, and is reflected off the BS 24. The BS is highly reflective with respect to the polarized S component, so that nearly all of the small polarized S component contained in the reflected light is reflected. Only a relatively small portion of the polarized P component is reflected.

The ratio of the polarized S component to the polarized P component contained in the light reflected off the BS 24 is larger than the ratio of S to P components in the beam reflected off the disk 1. Thus, the BS 24 has the function of amplifying the polarized S component over the polarized P component.

The light reflected off the BS 24 is then focused by the condensing lens 17B and strikes the PBS 25. The PBS 25 splits or separates any P component contained in the beam that is reflected off the BS 24 from the S component. The two split components form an angle of 45°. The differential amplifier 41 calculates the difference between the total signal obtained from the light detecting element 20, which receives the polarized P component which has passed through the PBS 25, and the total signal obtained from the light detecting element 21, which receives the polarized S component which is reflected off the PBS 25. A modulated signal can be obtained which corresponds to the direction in which disk 1 is magnetized.

Figure 10:
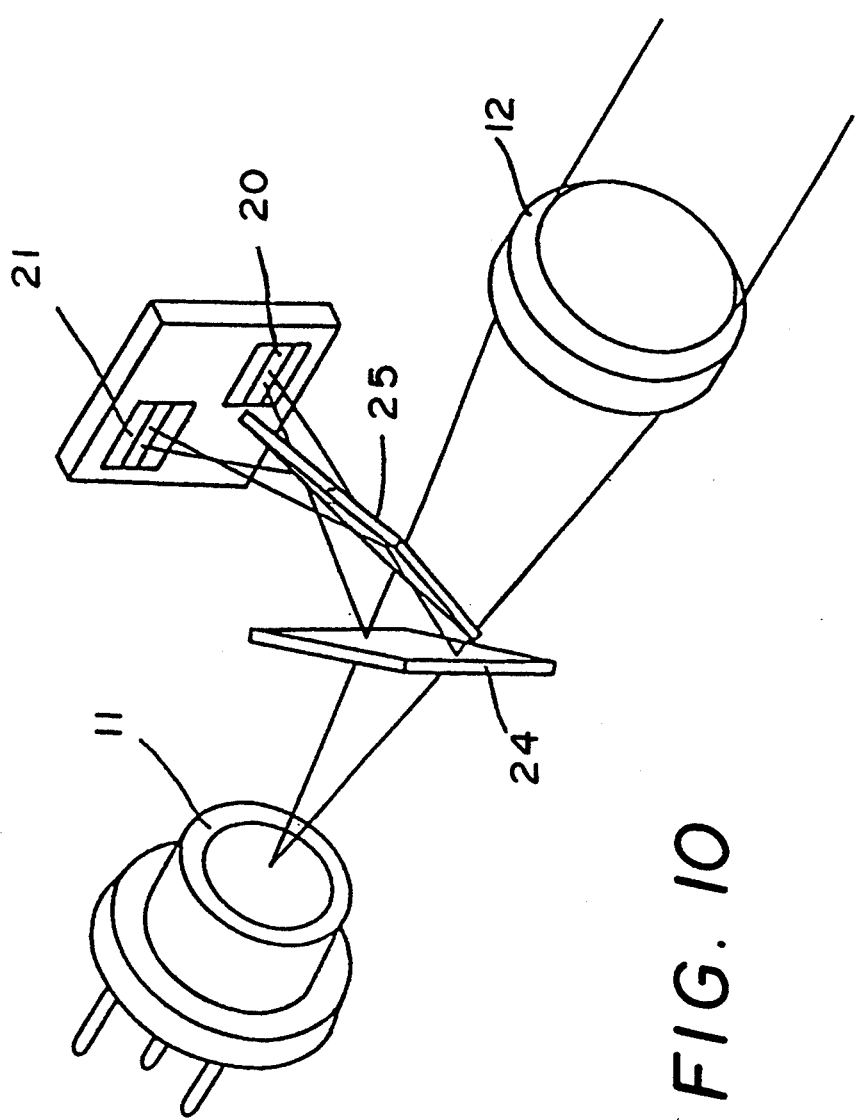
FIG. 10 is a block diagram showing the structure of the essential parts of a second embodiment of an optical read/write head employing the present invention.

In the second embodiment of the present invention, with reference to FIG. 10, the BS 24 is placed on the optical path between the semiconductor laser 11 and collimator lens 12, where the beam is diverging. The light reflected off the disk 1 is focused by the collimator lens 12. In this embodiment, the condensing lens 17 which was used in the embodiment of FIG. 6 is eliminated. The light reflected off the disk is further reflected off the BS 24 and directly transmitted to the PBS 25 without any need for further focusing. The placement of the other optical elements is same as in the embodiment of FIG. 6.

Figure 11:
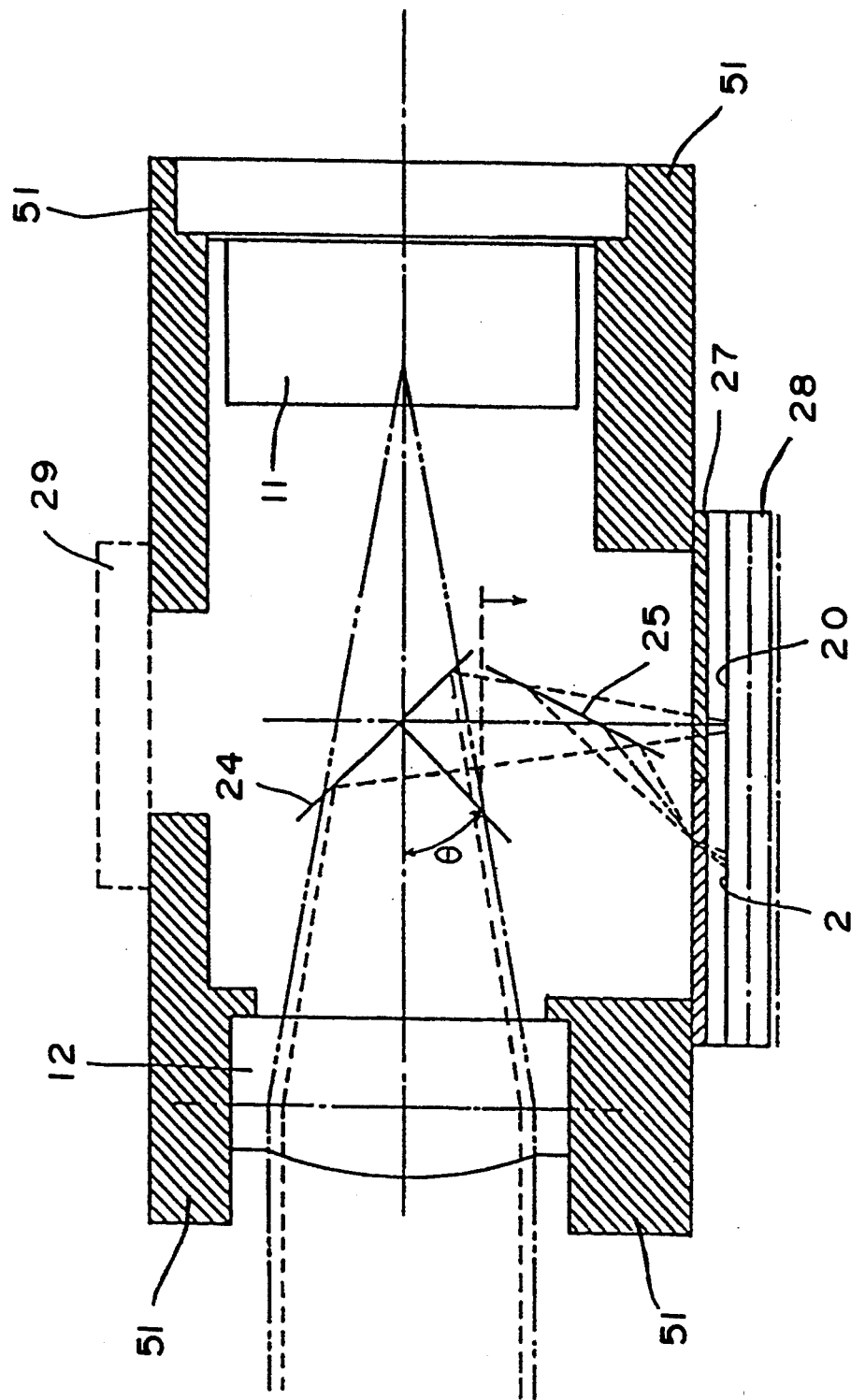
FIG. 11 shows a cross section of the essential parts of an optical read/write head which similar to the embodiment shown in FIG. 10.

The embodiment of FIG. 11 is similar to the embodiment of FIG. 10. However, in FIG. 11, the optical axis of the PBS 25 is rotated 45° from the center. By controlling the angle of rotation, the ratio of the quantity of transmitted light to that of reflected light can be controlled. A light detecting element 29 can be employed as a monitor to detect the intensity of the light emitted by the semiconductor laser 11, the light reflected off the BS 24, and the light again reflected off the reflective surface of the PBS 25.

Specifically, FIG. 11 shows a cross section of the optical elements with light detecting element 29 set in position to serve as a monitor. The semiconductor laser 11, the collimator lens 12 and the substrate 28 are all supported by a support frame 51. A window is provided in the side of support frame 51 opposite the substrate 28 for the light detecting element 29. The output from element 29 will vary with the intensity of the light emitted by the semiconductor laser 11. This output can be detected and used to control the output of the semiconductor laser 11 so that it remains at a previously determined level. Such a system would form what is called an APC (Automatic Power Control) servo.

As shown in FIG. 11, the angle $\theta$ formed by a line running perpendicular to the surface of the BS 24 and the optical axis of the beam emitted by semiconductor laser 11 should be greater than 45°. This makes it easier to achieve a polarizing thin film coating, and it makes it possible to amplify variations related to changes in the angle of polarization.

The BS 24 and the PBS 25 are both formed from transparent panels which are plane parallel plates. This enables the optical read/write head of the present invention to be made smaller and lighter.

In this embodiment, the tracking error signals may be detected using the push-pull method of the first embodiment. However, it is also possible to use be other conventional tracking detection method, such as a three-beam scheme or a differential push-pull scheme.

Figure 14:
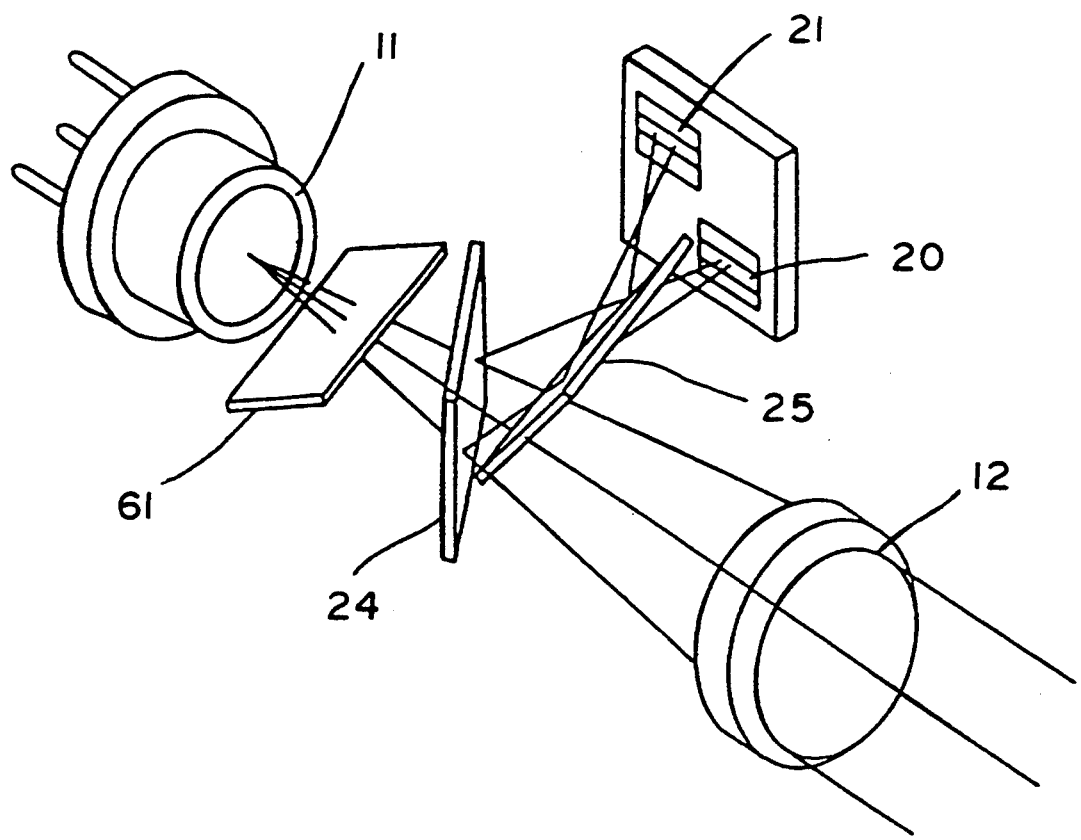
FIG. 14 is a perspective view showing the structure of the essential parts of an embodiment of an optical read/write head which similar to FIG. 10.

The embodiment shown in FIG. 14 is also similar to the embodiments of FIGS. 10 and 14. However, a transparent panel 61 of a plane parallel plate is placed in the optical path between the semiconductor laser 11 and the BS 24, to correct aberration induced by the BS 24. The transparent panel 61 can be also used to reflect the light emitted by the luminous element 11 to the light detecting element 29. The reflectivity of the transparent panel 61 is much less dependent on the angle than that of the BS 24, and is virtually independent of wavelength. This allows a more stable Automatic Power Control (APC) to be achieved.

Alternatively, the portion of the light reflected off the disk 1 which is reflected off the transparent panel 61 could be received by a bi-segmented light detecting element. Then the push-pull method could be used to detect tracking error signals. In this case, there would be no positional restrictions on the orientation of the optical axis of the bi-segmented light detecting element. The element could be placed where the beam has a large diameter, which would obviate the need for great precision in mounting thereof.

Figure 17A:
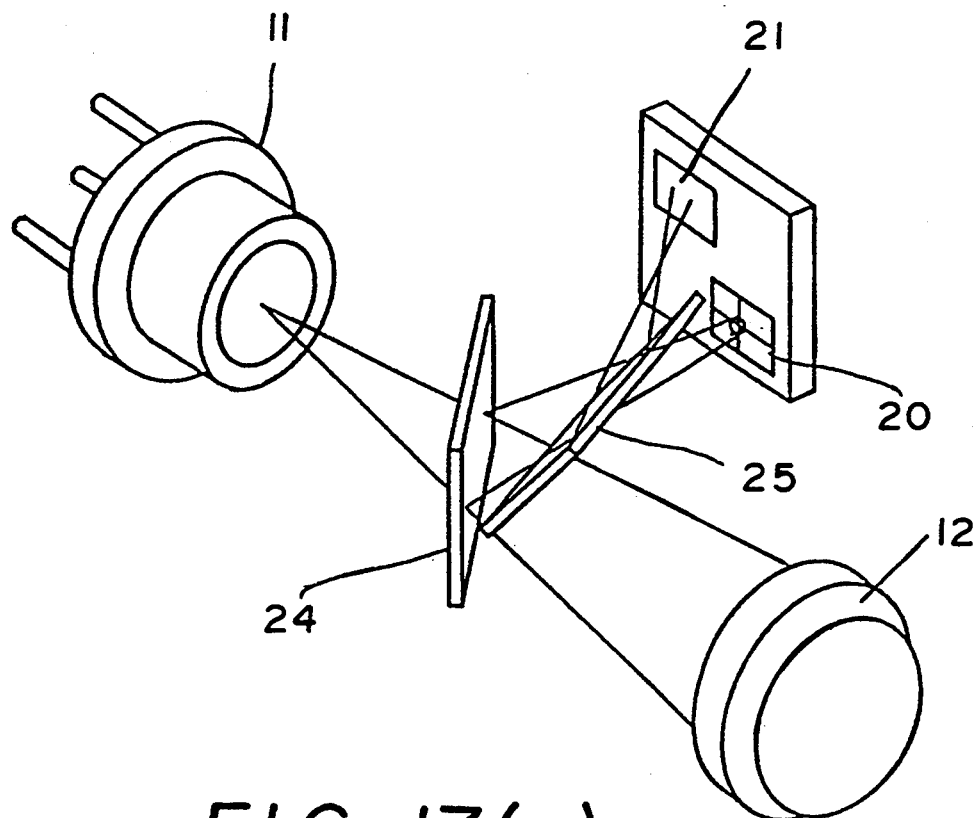
FIG. 17(a) is a perspective view showing the structure of the essential parts of an embodiment of an optical read/write head which similar to FIG. 14.

In the embodiment of FIG. 17(a), the BS 24 is also placed in the optical path between semiconductor laser 11 and collimator lens 12, where the beam is divergent. The light reflected off the disk 1 is focused by the collimator lens 12 as in the case of the embodiments of FIGS. 10, 11 and 14. Thus, the condensing lens 17 which was used in the embodiment of FIG. 6 has been eliminated. The light reflected off the disk, and now reflected off the BS 24, directly strikes the PBS 25 without further focusing. The placement of the other optical elements is just as in the embodiment of FIG. 6.

When a plane parallel plate is introduced in the focal part of an optical path, point-spread aberrations are generated when the light passes through the plate. Since the PBS 25 is a plane parallel plate, choosing an appropriate thickness for it enables to generate the appropriate point-spread aberrations.

Figure 17B:
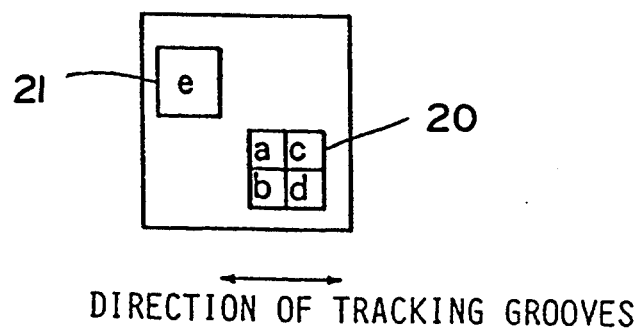
FIG. 17(b) shows a detailed structure of the light detecting elements of FIG. 17(a).

FIG. 17(b) shows the actual structure of the light detecting elements 20 and 21. The light detecting element 20 is divided into four regions (a, b, c and d), with one line running parallel to the direction of the tracking grooves and another running perpendicular to it. The light detecting element 21 is not divided. The reflected light split by the PBS 25 strikes the light detecting elements 20 and 21. The light detecting element 20, at this time, is subject to point-spread aberrations generated by the PBS 25.

Figure 18:
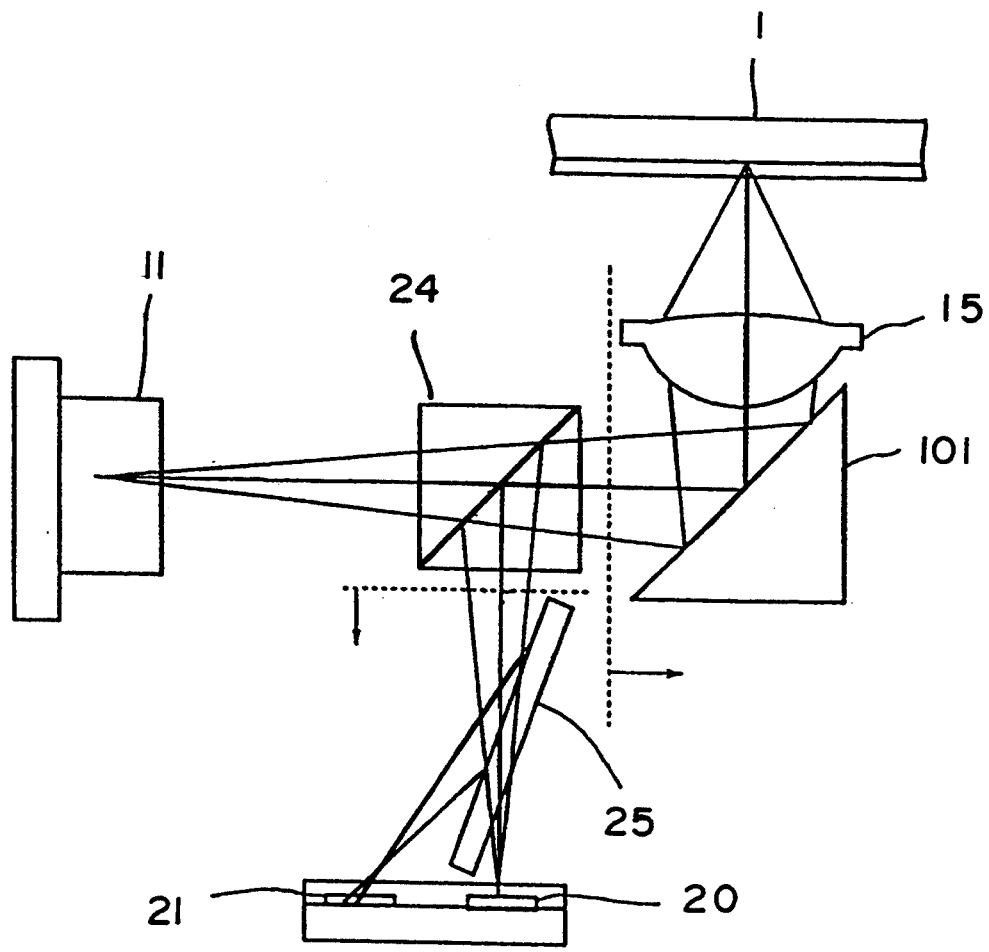
FIG. 18 is a side view showing the structure of the essential parts of another embodiment of an optical read/write head.

FIG. 18 illustrates a yet another embodiment of the present invention in which a mirror 101 and the BS 24 are placed in the optical path between the semiconductor laser 11 and the objective lens 15 along, where the beam diverges. The mirror 101 bends the light emitted by the semiconductor laser 11 by 90°.

Figure 15:
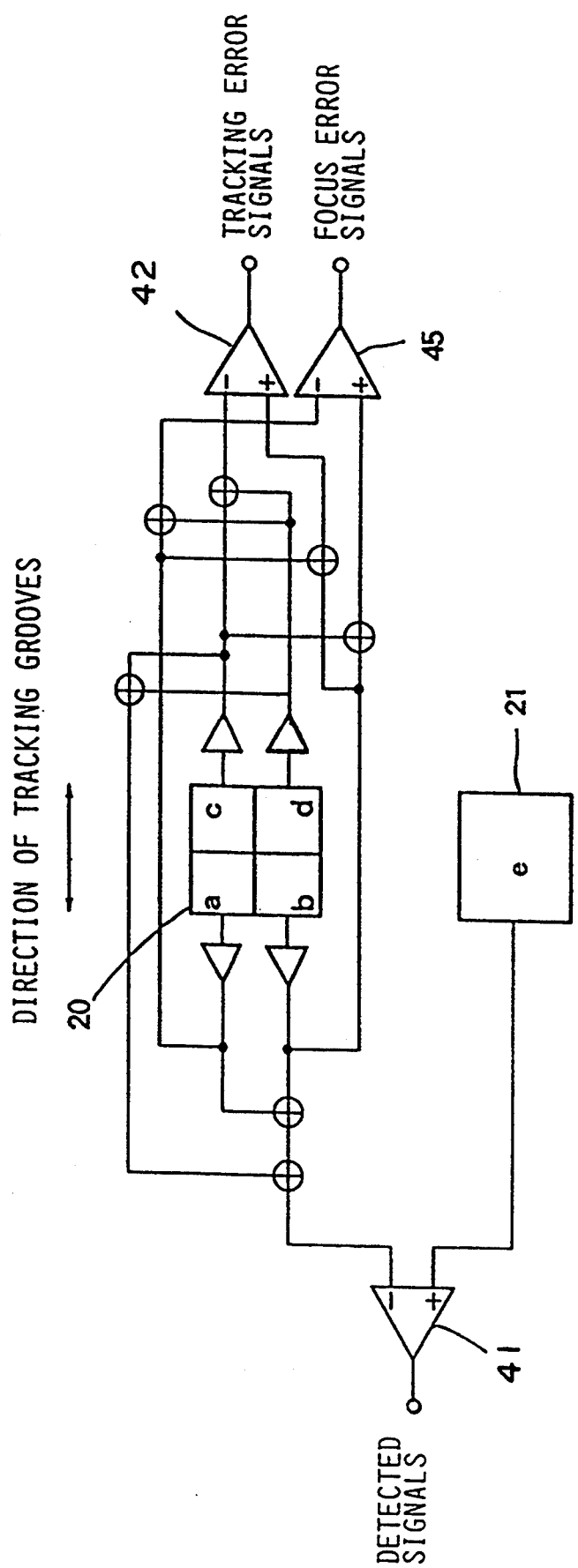
FIG. 15 is a block diagram showing the light detecting elements and their peripheral circuits in the optical read/write head shown in FIG. 17.

FIG. 15 shows the computing circuit which outputs tracking error and focus error signals for the embodiment of FIG. 17(a). In FIG. 15, the photodetection regions on the light detecting elements 20 and 21 are called a, b, c, d and e. The reproducing signal is designated as S, and the tracking error signal as TES, and the focus error signal as FES. These designations can be represented as follows:

$S=(e)-(a+b+c+d)$ $TES=(a+b)-(c+d)$ and $FES=(a+d)-(b+c)$

This being the case, there is no need to divide the light detecting element 21, which receives the light reflected off the PBS 25. There is no loss in quantity of light resulting from the gap at the dividing line, so a higher level of reproducing signal can be obtained. The light detecting element 21 is free to simply receive the light reflected off the PBS 25 and it can easily be adjusted.

Figure 16A:
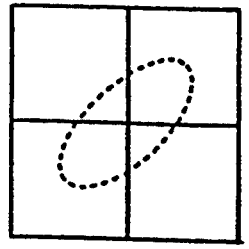
FIGS. 16(a),(b),(c) show the changes of the shape of the beam on the surface of the light detecting element in the optical read/write head shown in FIG. 15.
Figure 16B:
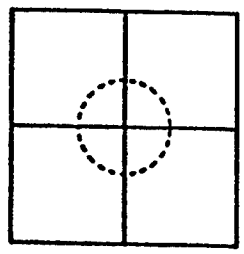
Figure 16C:
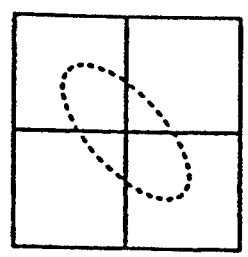

FIG. 16 shows how the shape of the beam striking the light detecting element 21 varies with the movement of the disk during focusing. In FIG. 16(a), the disk is too close; in FIG. 16(b) the focus is correct; in FIG. 16(c) the disk is too far away.

Figure 12:
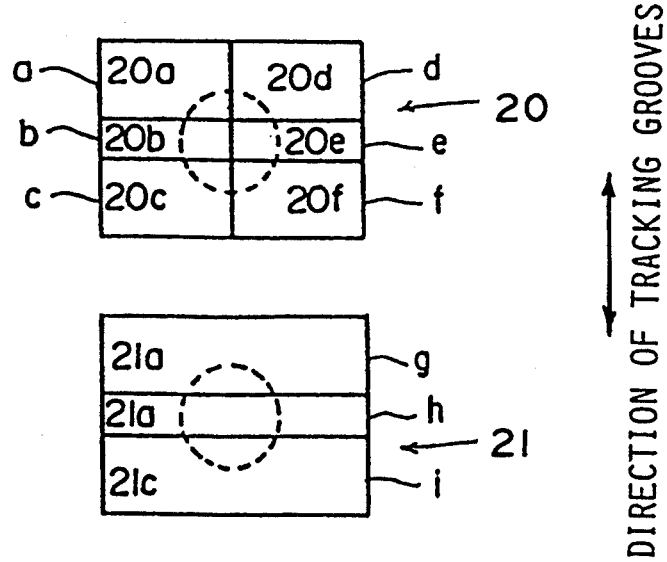
FIG. 12 illustrates the structure of light detecting elements of the read/write head.

In yet another embodiment of the light detecting elements, as shown in FIG. 12, the light detecting element 20 is divided into six photodetection regions, 20a through 20f. The light detecting element 21 is divided into three regions, 21a through 21c. Unlike the embodiment of FIG. 9, the dividing lines on the element 21 run perpendicular to the tracking groove. The outputs can be represented as follows, the outputs of photoelectric conversion obtained from regions 20a through 20f being designated as a through f, and those obtained from regions 21a through c as g through i:

$S=(a+b+c+d+e+f)-(g+h+i)$ $TES=(a+b+c)-(d+e+f)$ $FES=\{(a+d+c+f)-(b+e)\}-(g+i-h)$

With this scheme, the tracking servo function causes the beam to follow the track on the surface of the disk 1. Even if the beam striking the surface of the light detecting elements pictured in FIG. 12 moves left to right, its movement will have no effect on the focus error signal. Accordingly, a stable focus servo characteristic can be obtained.

The embodiments discussed so far, the BS 24 is preferably a prism which has a polarizing thin film on one side. Typically, the opposite side of the BS 24 would have a non-reflective coating. However, a prism without a non-reflective coating may be utilized if using the signal generator circuit shown in FIG. 9. This circuit generates useable reproducing signals and error signals for the servo even if light is reflected off both sides of the BS 24.

If the angle $\theta_1$ formed by PBS 25 and its incident beam is kept large, light detecting elements 20 and 21 can be separated by a longer distance. This will prevent the beams striking the two elements 20 and 21 from interfering with each other, and it will allow the user greater discretion in choosing how to arrange these two elements.

Figure 13:
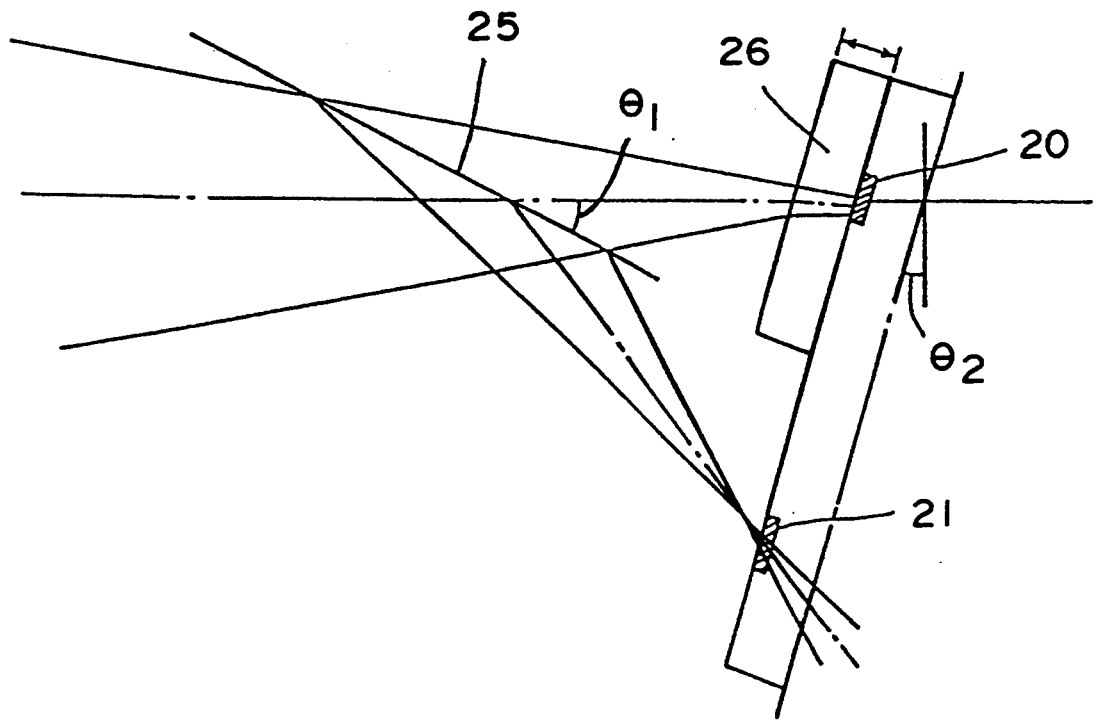
FIG. 13 is a magnified lateral view of the PBS and light detecting elements, which is similar to FIG. 8.

With respect to FIG. 13, should the angle $\theta_1$ become too large, the coma aberration at the surface of the light detecting element 21 will distort the shape of the beam. In that case, the substrate on which the light detecting elements 20 and 21 are mounted can be angled $\theta_2$ to permit the light to project onto the elements 20 and 21 as perpendicularly as possible. However, the length of the optical path of the beam striking the element 20 and that striking the element 21 differ only slightly, which makes it difficult to generate focus error signals with the beam size method.

To solve this problem, a prism 26, with an index of refraction n and thickness d, on the front surface of the light detecting element 20, as shown in FIG. 13. The prism will adjust the length of the optical path so as to increase the difference between the lengths of the two paths. In FIG. 13, the length of the optical path of the beam striking the light detecting element 20 (that is, the beam of the polarized component P) is represent as follows:

$$\Delta_1 = (d/\cos\theta_2) - (1/n)\cdot(d\cos\theta_2')$$

However, because $$\theta_2' = \arcsin\{(1/n)\cdot\sin 74\}),$$

the optical path will be shortened. By choosing an appropriate index of refraction n and thickness d, an optical path of the desired length can be found.

The light detecting element 29 could be used as a monitor in the embodiment shown in FIG. 6, similarly as in FIG. 11, which is suitably placed to detect the intensity of the light from the semiconductor laser 11 which has been reflected off the BS 24 and the reflective surface of the PBS 25. This would make it possible to control the output of semiconductor laser 11.

Figure 19A:
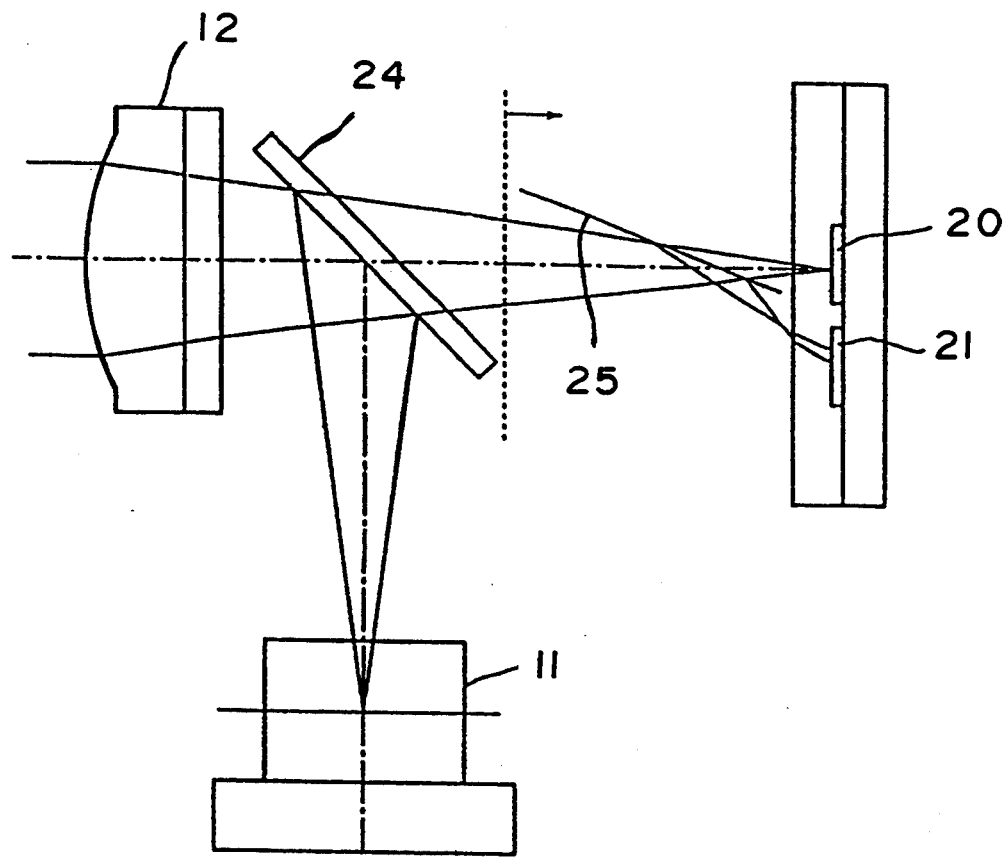
FIG. 19(a) is a side view showing the structure of the essential parts of another embodiment of an optical read/write head.
Figure 19B:
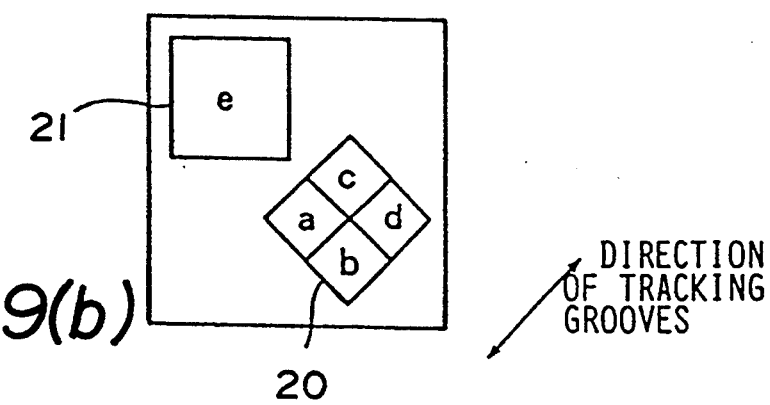
FIG. 19(b) shows a detailed structure of the light detecting elements of FIG. 19(a).
Figure 20A:
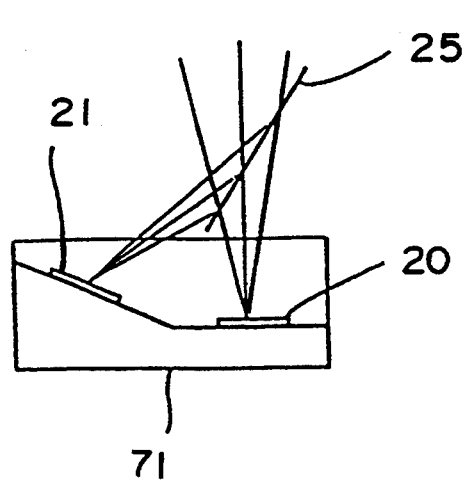
FIG. 20(a),(b) show lateral and perspective views, respectively, of another embodiment of a substrate for the light detecting elements.
Figure 20B:
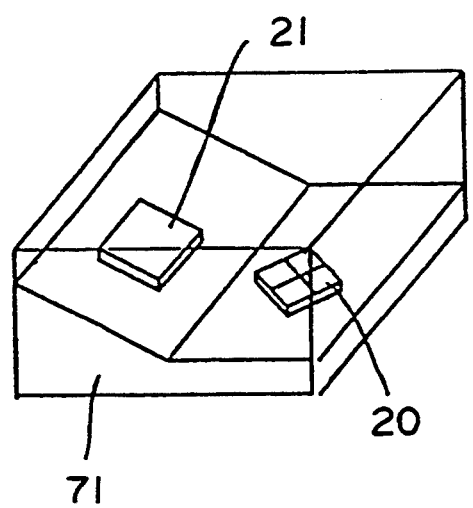

FIG. 19(a) shows yet another embodiment of an optical read/write head. In this embodiment, the BS 24 is placed in the optical path between the collimator lens 12 and the light detecting elements 20 and 21 so that it will generate point-spread aberrations. The BS 24 directly sends the light reflected off the disk 1 to the PBS 25. The optical axis of the PBS 25 is rotated 45° from the center. Thus the beams fall precisely on the light detecting elements 20 and 21.

FIGS. 20 through 23 illustrate some possible configurations for the substrate on which the light detecting elements 20 and 21 are supported. In FIGS. 20(a),(b), an inclined surface is provided on a base 71 so that the receptive surfaces of the light detecting elements 20 and 21 will form an angle greater than 90°.

Figure 21A:
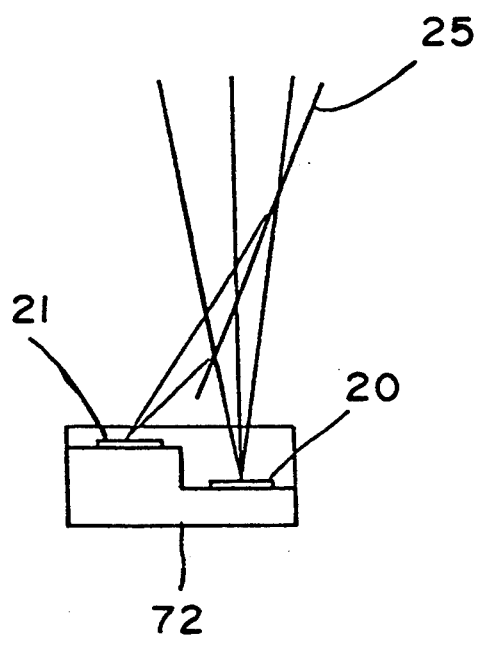
FIGS. 21(a),(b) show lateral and perspective views, respectively, of a further embodiment of a substrate for the light detecting elements.
Figure 21B:
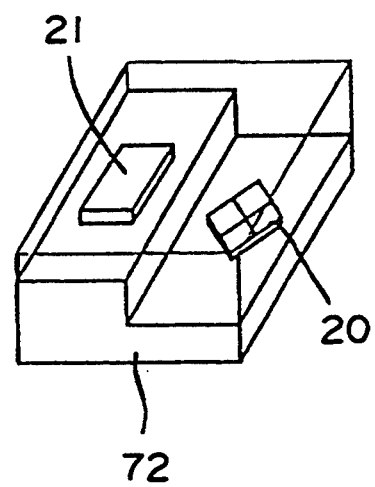

In FIGS. 21(a),(b), two different levels which are parallel to each other are provided on the base 71 so that the positions of the light detecting elements 20 and 21 coincide with the focal points of the beam split by the PBS 25.

Figure 22A:
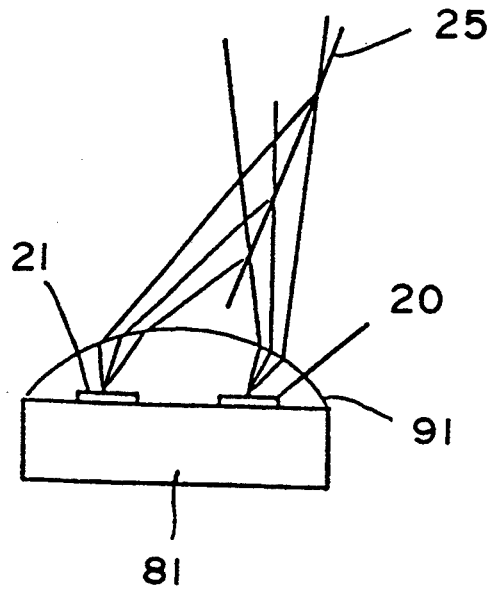
FIGS. 22(a),(b) show lateral and perspective views, respectively, of yet another embodiment of a substrate for the light detecting elements.
Figure 22B:
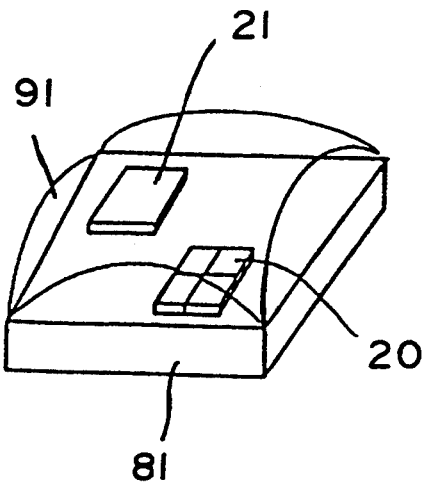

In FIGS. 22(a),(b), the light is focused by convex lens 91 on the receptive surface of base 81, on which the light detecting elements 20 and 21 are mounted.

Figure 23A:
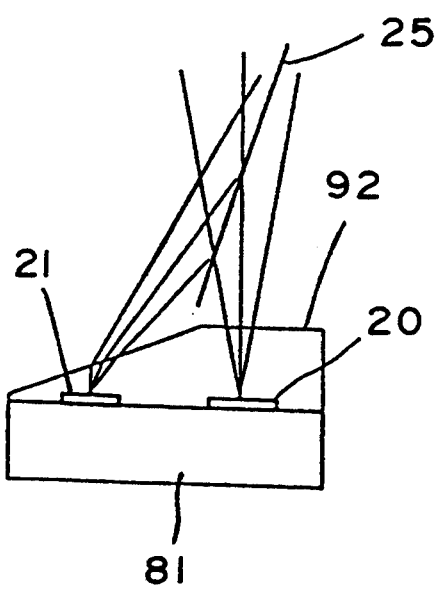
FIGS. 23(a),(b) show lateral and perspective views, respectively, of yet another embodiment of a substrate for the light detecting elements.
Figure 23B:
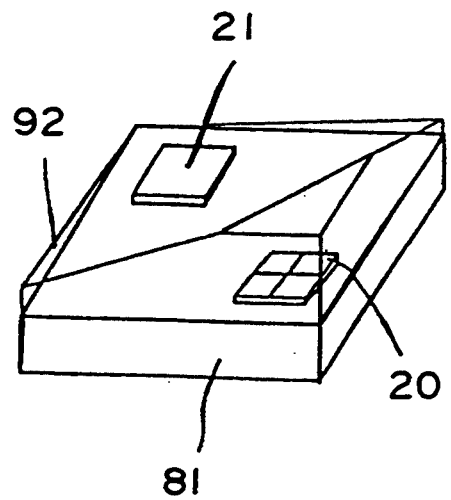

In FIG. 23(a),(b), the beams are focused at different angles of incidence on the receptive surface of the base 81, on which the light detecting elements 20 and 21 are mounted.

The substrates for the light detecting elements shown in FIG. 20 through 23 all keep the distance between the elements 20 and 21 short, which allows the read/write head to be made compact.

Figures 24A, 24B:
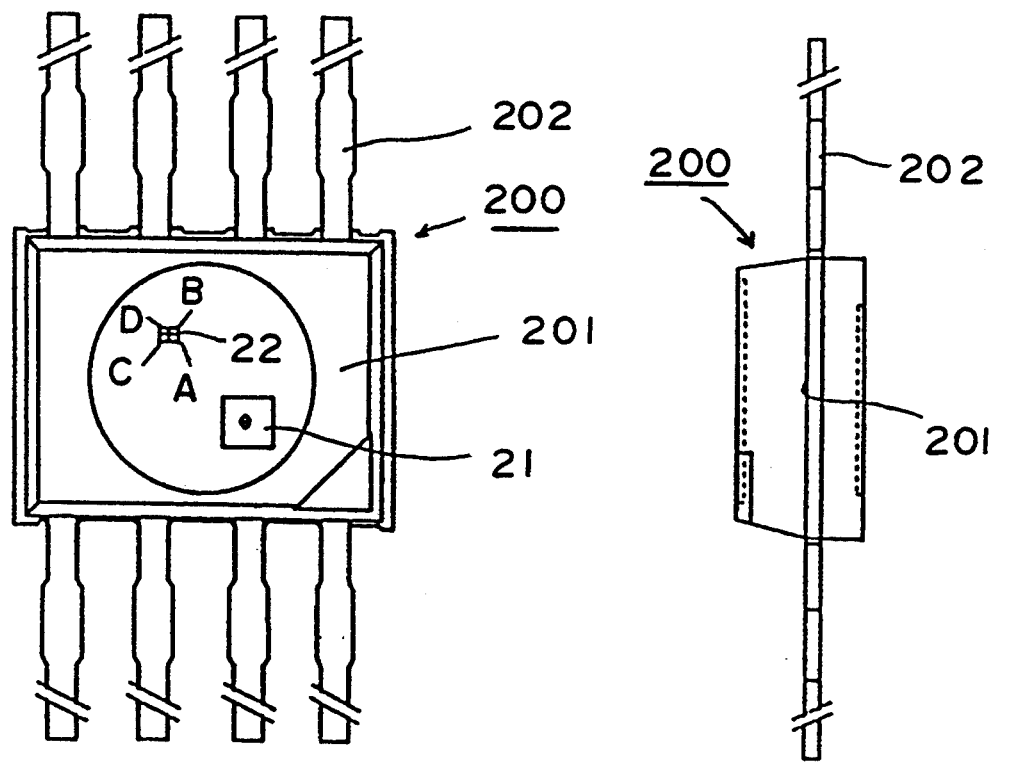
FIGS. 24(a),(b),(c) show top, front and side views, respectively, of a semiconductor chip.
Figure 24C:
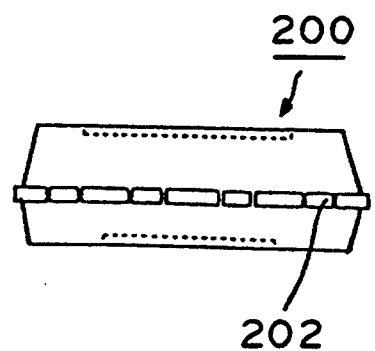

FIGS. 24(a),(b),(c) illustrate the structure of a semiconductor chip 200, on which the light detecting elements 20 and 21 have been formed. The light detecting elements 20 and 21 are formed as ICs on the chip substrate 201 and the terminals 202 are electrically connected to the elements 20 and 21.

Figure 25:
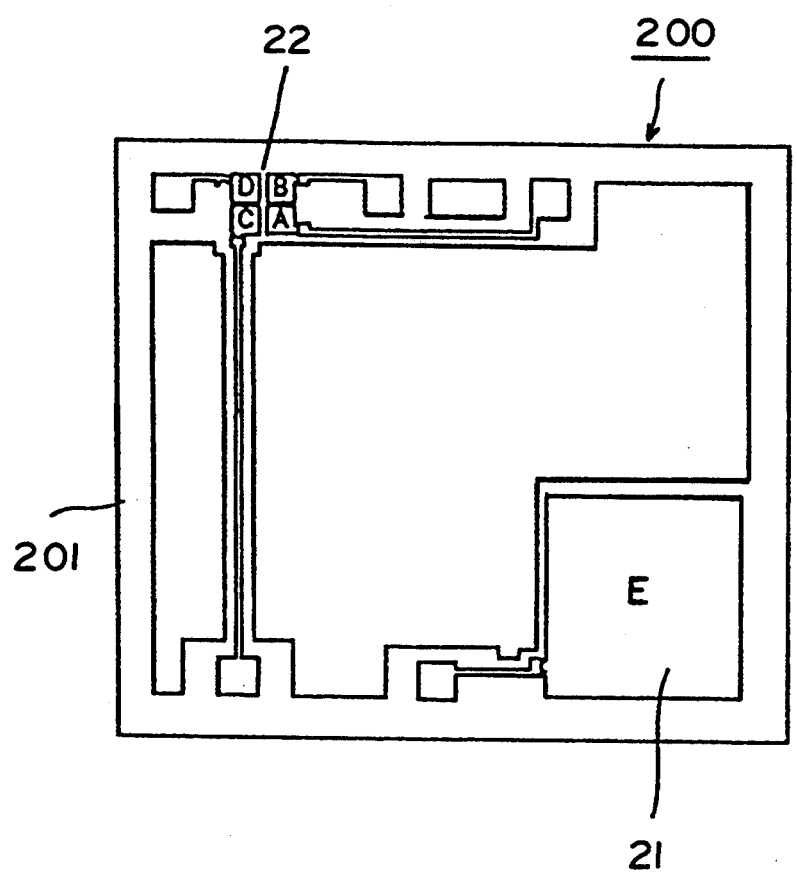
FIG. 25 shows the wiring pattern on the semiconductor chip of FIGS. 24(a),(b),(c).

FIG. 25 shows the actual wiring pattern on the chip substrate 201.

Figure 26:
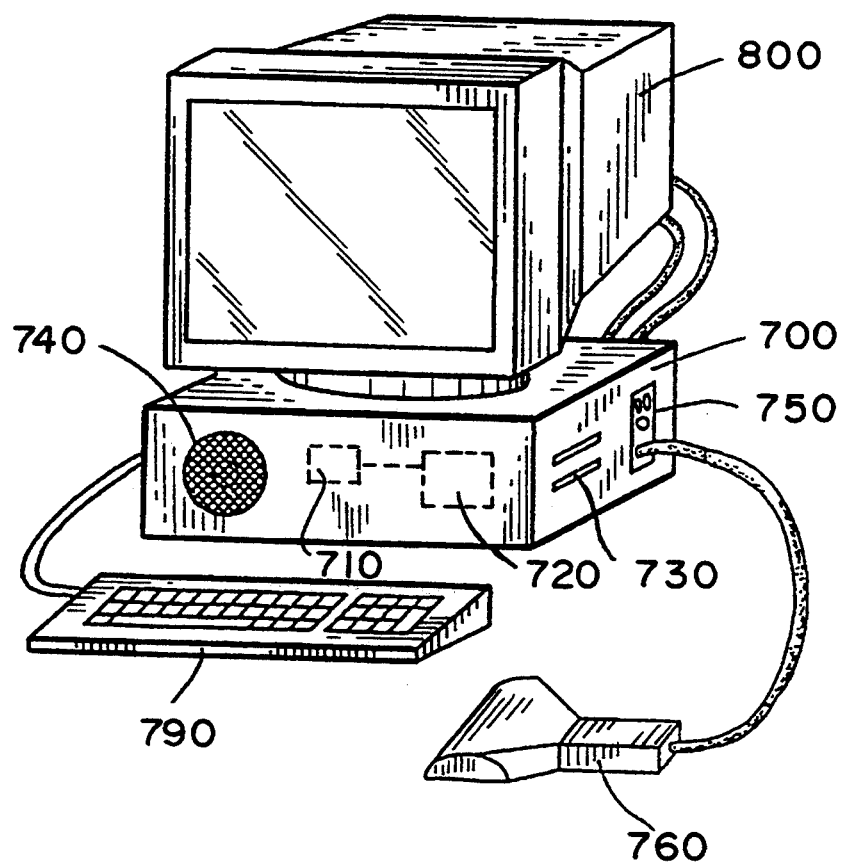
FIG. 26 shows graphical perspective view of the present invention incorporated in a system.
Figure 27:
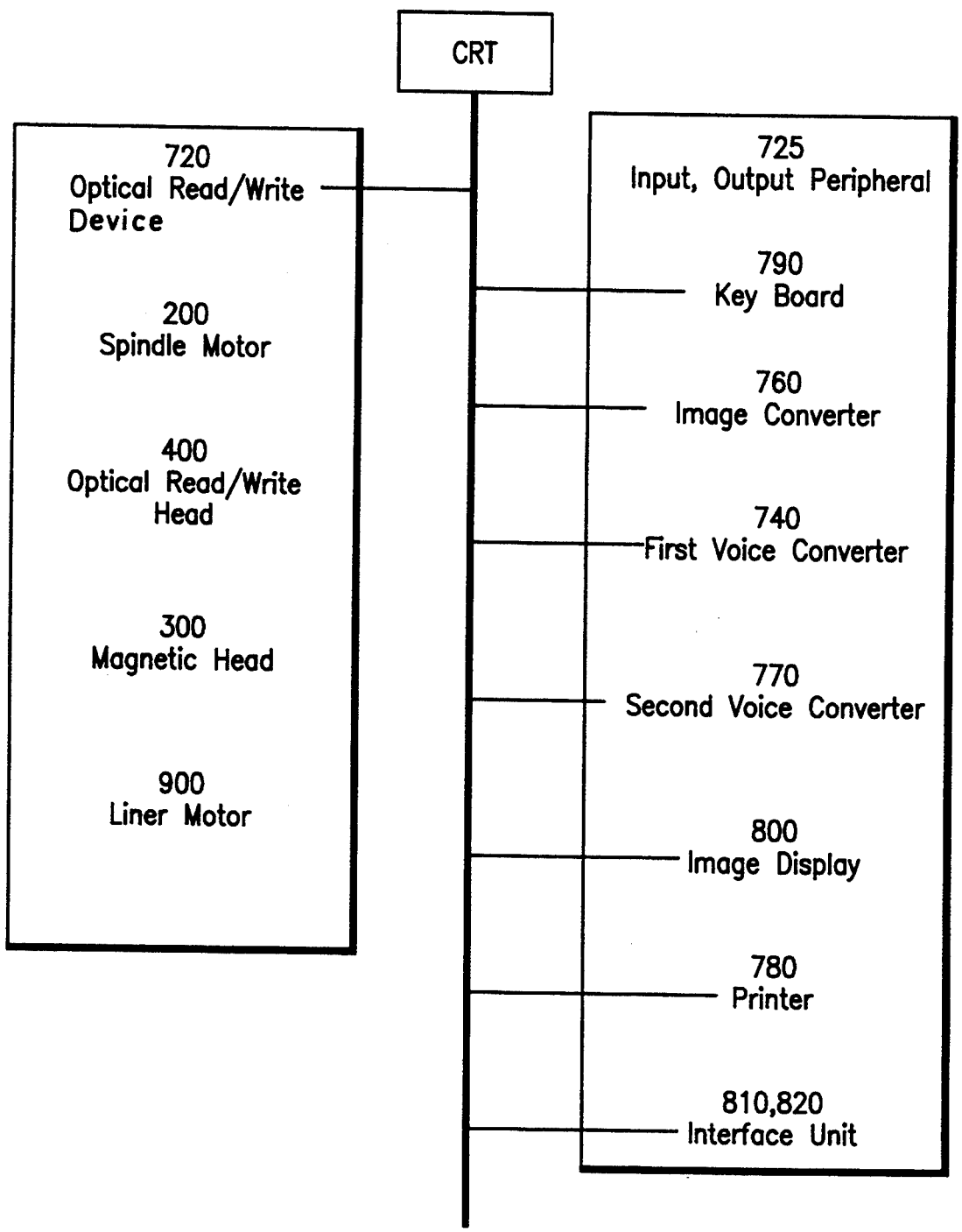
FIG. 27 shows a graphical representation of the system in FIG. 26.

FIGS. 26 and 27 show a graphical depiction of the present optical device. The main cabinet 700 contains a CPU 710 and an optical read/write device 720. The optical read/write device 720 has a spindle motor 200 as a disk driver unit to rotate a disk, an optical read/write head 400 of the present invention, a magnetic head 300 to generate a magnetic field so that input data can be recorded on the disk, a liner motor 900 as a optical read/write head driver to move the optical read/write head. The CPU 710 control the optical read/write device 720, a keyboard 790, an image converter 760 such as an image scanner, a first voice converter 740 such as a speaker, a second voice converter 770 such as a microphone, an image display 800 such as a CRT display, a printer 780, a first and second interface units 810, 820.

Since the optical read/write head of this invention is compact, the present invention enables another type of read/write head to be installed in the limited space, such as a non re-writable device. This configuration allows recordation of data with the present optical read/write device and transfer of such data to a non re-writable device for permanent recordation. It is also possible in the present configuration to choose a recording method for important data to be recorded with a non re-writable device.

This optical device shown in FIGS. 26 and 27 can be connected with a various input, output peripheral 725 to read or write data.

The media to be recorded is not limited to a round disk, but it can be an optical card having a different shape, i.e., rectangular. In this case, the disk drive unit moves the card horizontally and vertically.

Given the disclosure of the present invention, one versed in the art would readily appreciate the fact that there can be many modifications of the present invention not specifically depicted and described, but that are well within the scope and spirit of the disclosure set forth herein. Accordingly, all expedient modifications readily attainable by one versed in the art from the disclosure set forth herein that are within the scope and essence of the present invention, are to be included as further embodiments of the present invention.

What is claimed is:

1. An optical read/write head, comprising:
   a luminous means for emitting a light;
   a first lens means for collimating said emitted light into substantially parallel rays;
   a second lens means for focusing said parallel light rays onto an optical recording medium and for collimating a light reflected off said optical recording medium into substantially parallel rays;
   a first optical means, arranged at a predetermined location in an optical path between said first and second lens means where said rays are determined parallel, for separating a portion of said reflected light from a main optical axis between said first and said second lens means, said first optical means having a means for reflecting a majority of a first polarization of said reflected light as a separated portion away from said main optical axis, and having a means for transmitting a remainder of said reflected light along said main optical axis;

a second optical means for further separating said separated portion of said reflected light from said main optical axis into two mutually orthogonally polarized components having an included angle of less than 90°, said second optical means having a means for transmitting along a first path a majority of one from said mutually orthogonally polarized components of said separated portion, and means for reflecting onto a second path a majority of one from said mutually orthogonally polarized components of said separated light, said first and second paths being at said included angle;

a photodetector comprising two light receiving means, each having a respective receptive surface, for receiving, respectively, said two mutually orthogonally polarized components, said two light receiving means having their respective receptive surfaces oriented in substantially the same direction.

2. An optical read/write head, comprising:

a luminous means for emitting a divergent light on a predetermined optical path;

a first optical means, arranged in said optical path, at a point between said luminous means and said condensing means where said divergent light beam is divergent, for separating a portion of said reflected light, said first optical means having a means for reflecting a majority of a first polarization of said reflected light as a separated portion, and having a means for transmitting a remainder of said reflected light;

a second optical means for further separating said separated portion of said reflected light from said main optical axis into two mutually orthogonally polarized components having an included angle of less than 90°, said second optical means having a means for transmitting along a first path a majority of one from said mutually orthogonally polarized components of said separated portion, and means for reflecting onto a second path a majority of one from said mutually orthogonally polarized components of said separated light, said first and second paths being at said included angle;

a photodetector comprising two light receiving means, each having a respective receptive surface, for receiving, respectively, said two mutually orthogonally polarized components, said two light receiving means having their respective receptive surfaces oriented in substantially the same direction.

3. An optical read/write head, comprising:
a luminous means for emitting a light;
a first lens means for collimating said emitted light into substantially parallel rays;
a second lens means for focusing said parallel light rays onto an optical recording medium and for collimating said light reflected off said optical recording medium into substantially parallel rays;

a first optical means, arranged in an optical path between said first and second lens means at a predetermined location where said rays are determined parallel, for separating a portion of said reflected light from a main optical axis between said first and said second lens means, said first optical means having a means for reflecting a majority of a first polarization of said reflected light as a separated portion away from said main optical axis, and having a means for transmitting a remainder of said reflected light along said main optical axis a second optical means for further separating said separated portion of said reflected light from said main optical axis into two mutually orthogonally polarized components having an included angle of less than 90°, said second optical means having a means for transmitting along a first path a majority of one from said mutually orthogonally polarized components of said separated portion, and means for reflecting onto a second path a majority of one from said mutually orthogonally polarized components of said separated light, said first and second paths being at said included angle;

a photodetector comprising two light receiving means, each having a respective receptive surface, for receiving, respectively, said two mutually orthogonally polarized components, said two light receiving elements being positioned on a single substrate.

4. An optical read/write head, comprising:
a luminous means for emitting a divergent light beam along a predetermined optical path;
a condensing means for focusing said emitted light onto an optical recording medium and for focusing a light reflected off said optical recording medium;
a first optical means, arranged in said optical path, between said luminous means and said condensing means where said divergent light beam is divergent for separating a portion of said reflected light from a main optical axis between said first and said second lens means, said first optical means having a means for reflecting a majority of a first polarization of said reflected light as a separated portion away from said main optical axis, and having a means for transmitting a remainder of said reflected light along said main optical axis;

a second optical means for further separating said separated portion of said reflected light from said main optical axis into two mutually orthogonally polarized components having an included angle of less than 90°, said second optical means having a means for transmitting along a first path a majority of one from said mutually orthogonally polarized components of said separated portion, and means for reflecting onto a second path a majority of one from said mutually orthogonally polarized components of said separated light, said first and second paths being at said included angle;

a photodetector comprising two light receiving means, each having a corresponding receptive surface, for receiving, respectively, said two mutually orthogonally polarized components, said two light receiving means being arranged on a single substrate.

5. An optical read/write head according to claims 3 or 4, wherein said receptive surfaces of said two light receiving means form an angle greater than 90°.

6. An optical read/write head according to claims 1, 2, 3, or 4, wherein said two light receiving means are formed on a chip which is made from a single semiconductor wafer.

7. An optical read/write head according to claims 1, 2, 3, or 4, wherein said first optical mean has means for separating such that an optical axis of said portion of said light reflected from said first optical means and said main optical axis form an angle of approximately 45° and wherein said second optical means further separates optical axes such that said two mutually orthogonally polarized components reflected on said second optical means form an angle of approximately 45°.

8. An optical read/write head according to claims 1, 2, 3, or 4, wherein said second optical means comprises a flat and transparent material.

9. An optical read/write head according to claims 1, 2, 3, or 4, wherein said first optical means comprises a flat and transparent material.

10. An optical read/write head according to claims 1, 2, 3, or 4, wherein one of said two light receiving means is arranged for receiving light in front of a focal point of said second optical means, and wherein the other light receiving means is arranged for receiving light behind said focal point.

11. An optical read/write head according to claims 1, 2, 3, or 4, wherein said receptive surfaces of said light receiving means are divided, along lines of specified orientation, into at least three regions.

12. An optical read/write head according to claim 8, wherein said second optical means includes a means to detect focus error signals corresponding to point-spread aberrations, which occur when light passes through said flat and transparent material of said second optical means, comprising a surface of said flat transparent material having at least four distinct regions.

13. An optical read/write head according to claim 9, wherein said first optical means includes a means to detect focus error signals corresponding to point-spread aberrations, which occur when light passes through said flat and transparent material of said first optical means, comprising a surface of said flat transparent material having at least four distinct regions.

14. An optical read/write head according to claim 7, wherein said second optical means has a means for being rotated, so that an angle of said second optical means can be adjusted.

15. An optical device, comprising:
an optical read/write head, comprising:
a luminous means for emitting a light;
a first lens means for collimating said emitted light into substantially parallel rays;
a second lens means for focusing said parallel light rays onto an optical recording medium and for collimating a light reflected by said optical recording medium into substantially parallel rays;
a first optical means, arranged in an optical path between said first and second lens means, at a predetermined location where said rays are parallel, for separating a portion of said reflected light from a main optical axis between said first and said second lens means, said first optical means having a means for reflecting a majority of a first polarization of said reflected light as a separated portion away from said main optical axis, and having a means for transmitting a remainder of said reflected light along said main optical axis;
a second optical means for further separating said separated portion of said reflected light from said main optical axis into two mutually orthogonally polarized components having an included angle of less than 90°, said second optical means having a means for transmitting along a first path a majority of one from said mutually orthogonally polarized components of said separated portion, and means for reflecting onto a second path a majority of one from said mutually orthogonally polarized components of said separated light, said first and second paths being at said included angle;
a photodetector comprising two light receiving means for receiving, respectively, said two mutually orthogonally polarized components, said two light receiving means each having a respective receiving surface and being positioned so that the receptive surfaces of the two said light receiving means are oriented in substantially the same direction, said two light receiving means having means for outputting a data signal in accordance with a received light;
a drive means for imparting a motion to an optical recording medium;
a head driver means for driving said optical read/write head; and
a processing means for processing the output data signal from said optical read/write head.

16. An optical device, comprising:
an optical read/write head, comprising:
a luminous means for emitting divergent light beam along a predetermined optical path;
a condensing means for focusing said emitted light onto an optical recording medium and for focusing a light reflected by said optical recording medium;
a first optical means, arranged in said optical path between said luminous means and said condensing means where said divergent light beam is divergent for separating a portion of said reflected light, said first optical means having a means for reflecting a majority of a first polarization of said reflected light as a separated portion away from said optical path, and having a means for transmitting a remainder of said reflected light along said optical path;
a second optical means for further separating said separated portion of said reflected light into two mutually orthogonally polarized components having an included angle of less than 90°, said second optical means having a means for transmitting along a first path a majority of one from said mutually orthogonally polarized components of said separated portion, and means for reflecting onto a second path a majority of one from said mutually orthogonally polarized components of said separated light, said first and second paths being at said included angle;
a photodetector, Comprising two light receiving means, for receiving, respectively, said two mutually orthogonally polarized components, said two light receiving means each having a respective receiving surface and being positioned so that the receptive surfaces of the two said light receiving means are oriented in substantially the same direction, said two light receiving means having means for outputting a data signal in accordance with a received light;
a drive means for imparting a motion to an optical recording medium;

a head driver means for driving said optical read/write head; and a processing means for processing the output data signal from said optical read/write head.

17. An optical device, comprising:
an optical read/write head, comprising:
a luminous means for emitting a light;
a first lens means for collimating said emitted light into substantially parallel rays;
a second lens means for focusing said parallel light rays onto an optical recording medium, and for collimating a light reflected by said optical recording medium into substantially parallel rays;
a first optical means, arranged in an optical path between said first and second lens means, at a predetermined location where said rays are determined parallel, for separating a portion of said reflected light from a main optical axis between said first and said second lens means, said first optical means having a means for reflecting a majority of a first polarization of said reflected light as a separated portion away from said main optical axis, and having a means for transmitting a remainder of said reflected light along said main optical axis;
a second optical means for further separating said separated portion of said reflected light from said main optical axis into two mutually orthogonally polarized components having an included angle of less than 90°, said second optical means having a means for transmitting along a first path a majority of one from said mutually orthogonally polarized components of said separated portion, and means for reflecting onto a second path a majority of one from said mutually orthogonally polarized components of said separated light, said first and second paths being at said included angle;
a photodetector comprising two light receiving means for receiving, respectively, said two mutually orthogonally polarized components, said two light receiving means being arranged on a single substrate, said two light receiving means having means for outputting a data signal in accordance with a received light,
a driver means for imparting a motion to an optical recording medium;
a head driver means for driving said optical read/write head; and
a processing means for processing the output data signal from said optical read/write head.

18. An optical device, comprising:
an optical read/write head, comprising:
a luminous means for emitting a divergent light beam along a predetermined optical path;
a condensing means for focusing said emitted light onto said optical recording medium and for focusing a light reflected by said optical recording medium;
a first optical means, arranged in an optical path between said luminous means and said condensing means where said divergent light beam is divergent for separating a portion of said reflected light, by reflecting said portion and transmitting a remainder;
a first optical means, arranged in an optical path between said luminous means and said condensing means, said first optical means having a means for reflecting a majority of a first polarization of said reflected light as a separated portion, and having a means for transmitting a remainder of said reflected light;
a second optical means for further separating said separated portion of said reflected light into two mutually orthogonally polarized components having an included angle of less than 90°, said second optical means having a means for transmitting along a first path a majority of one from said mutually orthogonally polarized components of said separated portion, and means for reflecting onto a second path a majority of one from said mutually orthogonally polarized components of said separated light, said first and second paths being at said included angle;
a photodetector comprising two light receiving means for receiving, respectively, said two mutually orthogonally polarized components, said two light receiving means being arranged on a single substrate, said two light receiving means having means for outputting a data signal in accordance with a received light;
a driver means for imparting a motion to an optical recording medium;
a head driver means for driving said optical read/write head; and
a processing means for processing the output data signal from said optical read/write head.

19. An optical device according to claims 15, 16, 17, or 18, further comprising a magnetic head having means for generating a magnetic field on said disk, so that said magnetic field can record an input data on a track of said disk at a position which said optical read/write head heats by emitting an optical beam.

20. An optical device according to claims 15, 16, 17 or 18, further comprising a voice output converter means for converting said output data signal to a voice output.

21. An optical device according to claim 19, further comprising a voice input converter means for converting input to said input data to record on said recording medium.

22. An optical device according to claims 15, 16, 17 or 18, further comprising an image converter means for converting said output data signal to an image data and an image display means for displaying said image data.

23. An optical device according to claim 19, further comprising an image input converter means for converting a graphic image into said input data to record on said disk recording medium.

24. An optical device according to claims 15, 16, 17 or 18, further comprising a means for printing information according to said output data signal.

25. An optical device according to claim 19, further comprising a keyboard means for inputting characters and symbols as said input data to be recorded on said recording medium.

26. An optical device according to claim 19, further comprising an input interface means for interfacing said input data with an external input device.

27. An optical device according to claims 15, 16, 17 or 18, further comprising an output interface means for interfacing said output data signal with an external output device.

* * * * *